US011254087B2

(12) United States Patent
Null et al.

(10) Patent No.: US 11,254,087 B2
(45) Date of Patent: Feb. 22, 2022

(54) MICRO-PERFORATED GLASS LAMINATES AND METHODS OF MAKING THE SAME

(71) Applicant: CORNING INCORPORATED, Corning, NY (US)

(72) Inventors: Eric Louis Null, Corning, NY (US); Prashanth Abraham Vanniamparambil, Binghamton, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/607,608

(22) PCT Filed: Apr. 26, 2018

(86) PCT No.: PCT/US2018/029494

§ 371 (c)(1),
(2) Date: Oct. 23, 2019

(87) PCT Pub. No.: WO2018/200760

PCT Pub. Date: Nov. 1, 2018

(65) Prior Publication Data

US 2020/0079057 A1 Mar. 12, 2020

Related U.S. Application Data

(60) Provisional application No. 62/490,253, filed on Apr. 26, 2017.

(51) Int. Cl.

*B32B 3/24* (2006.01)
*B32B 7/12* (2006.01)

(Continued)

(52) U.S. Cl.

CPC ................ *B32B 3/266* (2013.01); *B32B 7/12* (2013.01); *B32B 17/10036* (2013.01);

(Continued)

(58) Field of Classification Search

None

See application file for complete search history.

(56) References Cited

U.S. PATENT DOCUMENTS

| | | | | |
|---|---|---|---|---|
| 3,087,574 A * | 4/1963 | Watters | B32B 17/10366 181/208 |
| 3,249,178 A * | 5/1966 | Watters | B32B 17/10366 181/286 |

(Continued)

FOREIGN PATENT DOCUMENTS

| | | | | |
|---|---|---|---|---|
| CN | 1046985 C | 12/1999 | |
| CN | 2388062 Y * | 7/2000 | G10K 11/172 |

(Continued)

OTHER PUBLICATIONS

Machine Translation of EP-1950357-A1, Jul. 2008 (Year: 2008).*

(Continued)

*Primary Examiner* — Jeffrey A Vonch

(57) ABSTRACT

Some embodiments of present disclosure are directed to a micro-perforated glass or glass-ceramics laminate, comprising a first substrate laminated to a second substrate by a first polymer interlayer, wherein the first and the second substrates are independently selected from glass or glass-ceramics, and a plurality of micro-perforations, each of the plurality of micro-perforations extending through the first substrate, the first polymer interlayer, and the second substrate. Some embodiments are directed to methods of forming such micro-perforated glass or glass-ceramics laminates.

17 Claims, 21 Drawing Sheets

(51) Int. Cl.

| | |
|---|---|
| ***B32B 17/10*** | (2006.01) |
| ***B32B 38/04*** | (2006.01) |
| ***G10K 11/168*** | (2006.01) |
| ***B32B 3/26*** | (2006.01) |
| ***C03C 23/00*** | (2006.01) |
| ***C03C 15/00*** | (2006.01) |
| ***G10K 11/162*** | (2006.01) |
| *E04B 1/84* | (2006.01) |
| *E04B 1/86* | (2006.01) |
| *B32B 38/00* | (2006.01) |
| *C04B 37/04* | (2006.01) |

(52) U.S. Cl.

CPC .... *B32B 17/10045* (2013.01); *B32B 17/1099* (2013.01); *B32B 17/10293* (2013.01); *B32B 17/10788* (2013.01); *C03C 15/00* (2013.01); *C03C 23/0025* (2013.01); *G10K 11/162* (2013.01); *G10K 11/168* (2013.01); *B32B 17/1077* (2013.01); *B32B 17/10119* (2013.01); *B32B 17/10146* (2013.01); *B32B 17/10165* (2013.01); *B32B 17/10743* (2013.01); *B32B 17/10752* (2013.01); *B32B 17/10761* (2013.01); *B32B 17/10807* (2013.01); *B32B 38/0008* (2013.01); *B32B 2038/047* (2013.01); *B32B 2250/03* (2013.01); *B32B 2250/05* (2013.01); *B32B 2250/40* (2013.01); *B32B 2307/102* (2013.01); *B32B 2307/41* (2013.01); *B32B 2307/412* (2013.01); *B32B 2307/414* (2013.01); *C04B 37/047* (2013.01); *E04B 1/8409* (2013.01); *E04B 1/86* (2013.01); *E04B 2001/848* (2013.01); *E04B 2001/8461* (2013.01); *E04B 2001/8495* (2013.01); *Y10T 428/24322* (2015.01)

(56) References Cited

U.S. PATENT DOCUMENTS

| | | | | |
|---|---|---|---|---|
| 4,952,457 | A * | 8/1990 | Cartier | B32B 27/40 428/425.6 |
| 5,190,826 | A * | 3/1993 | Asahina | B32B 17/10009 428/437 |
| 5,532,440 | A * | 7/1996 | Fujiwara | E04C 2/54 181/289 |
| 5,700,527 | A * | 12/1997 | Fuchs | E04B 1/8209 181/224 |
| 5,824,973 | A | 10/1998 | Haines et al. | |
| 5,942,736 | A * | 8/1999 | Cortonesi | E01F 8/0064 181/289 |
| 6,074,732 | A * | 6/2000 | Garnier | B32B 27/36 428/215 |
| 2002/0000292 | A1 * | 1/2002 | Habeck | C03B 33/107 156/270 |
| 2005/0133302 | A1 * | 6/2005 | Pfaffelhuber | B60R 13/08 181/293 |
| 2006/0063007 | A1 * | 3/2006 | Anderson | B32B 27/08 428/412 |
| 2008/0257642 | A1 * | 10/2008 | Yamagiwa | G10K 11/172 181/292 |
| 2008/0264720 | A1 * | 10/2008 | Vigran | G10K 11/16 181/286 |
| 2008/0318028 | A1 * | 12/2008 | Winstanley | B32B 17/10761 428/332 |
| 2009/0013724 | A1 | 1/2009 | Koyo et al. | |
| 2010/0300800 | A1 * | 12/2010 | Leconte | B32B 17/10761 181/290 |
| 2011/0147059 | A1 * | 6/2011 | Ma | H01L 24/17 174/258 |
| 2013/0163801 | A1 * | 6/2013 | Ha | H04M 1/185 381/334 |
| 2015/0110991 | A1 * | 4/2015 | Miwa | B23K 26/40 428/77 |
| 2015/0166396 | A1 * | 6/2015 | Marjanovic | C03B 33/091 428/137 |
| 2015/0267402 | A1 | 9/2015 | Borrelli et al. | |
| 2016/0009066 | A1 * | 1/2016 | Nieber | B23K 26/53 156/272.8 |
| 2016/0279895 | A1 * | 9/2016 | Marjanovic | B23K 26/0652 |
| 2016/0354996 | A1 * | 12/2016 | Alder | B32B 17/10174 |
| 2017/0256249 | A1 * | 9/2017 | Krasnov | G10K 11/1752 |
| 2017/0274738 | A1 * | 9/2017 | Kanki | B32B 17/10761 |
| 2018/0082669 | A1 * | 3/2018 | Lu | B32B 17/1055 |
| 2019/0019490 | A1 * | 1/2019 | Hakuta | G10K 11/172 |
| 2020/0001932 | A1 * | 1/2020 | Mottsmith | B32B 17/06 |
| 2020/0262742 | A1 * | 8/2020 | Jaramillo | C03C 15/00 |

FOREIGN PATENT DOCUMENTS

| | | | | |
|---|---|---|---|---|
| CN | 2535525 | Y * | 2/2003 | |
| CN | 1804358 | A | 7/2006 | |
| CN | 101368470 | A * | 2/2009 | |
| CN | 201297108 | Y * | 8/2009 | |
| CN | 101634215 | A * | 1/2010 | |
| CN | 101654995 | A * | 2/2010 | |
| CN | 203533844 | U | 4/2014 | |
| CN | 104344202 | A * | 2/2015 | E06B 5/205 |
| CN | 104476856 | A * | 4/2015 | G10K 11/168 |
| CN | 104870386 | A | 8/2015 | |
| CN | 105492196 | A | 4/2016 | |
| CN | 105682850 | A | 6/2016 | |
| CN | 106285338 | A | 1/2017 | |
| DE | 9116233 | U1 * | 6/1992 | E06B 5/205 |
| DE | 4437196 | C1 * | 3/1996 | E04B 1/8209 |
| DE | 19717266 | C1 | 4/1998 | |
| DE | 19920969 | A1 * | 11/2000 | B60R 13/08 |
| EP | 0204188 | A1 * | 12/1986 | B32B 17/10761 |
| EP | 0531886 | A1 | 3/1993 | |
| EP | 1146178 | A2 * | 10/2001 | G10K 11/172 |
| EP | 1842977 | A1 * | 10/2007 | E04B 1/86 |
| EP | 1950357 | A1 * | 7/2008 | E04B 1/8409 |
| EP | 1990125 | A1 | 11/2008 | |
| FR | 2826913 | A1 * | 1/2003 | B60J 1/17 |
| JP | 2002146727 | A * | 5/2002 | G10K 11/172 |
| JP | 2005104819 | A * | 4/2005 | B32B 17/1099 |
| JP | 2007262765 | A * | 10/2007 | E04B 1/8409 |
| JP | 2007262765 | A | 10/2007 | |
| JP | 2010007278 | A * | 1/2010 | |
| JP | 2015-181833 | A | 10/2015 | |
| KR | 200430890 | Y1 * | 11/2006 | B32B 17/10036 |
| WO | WO-2013054902 | A1 * | 4/2013 | G10K 11/168 |
| WO | WO-2013128103 | A1 * | 9/2013 | B28D 1/048 |
| WO | WO-2015017198 | A1 * | 2/2015 | B32B 17/10036 |
| WO | WO-2016185907 | A1 * | 11/2016 | B60R 13/08 |
| WO | 2018085249 | A1 | 5/2018 | |

OTHER PUBLICATIONS

Machine Translation of JP-2007262765-A, Oct. 2007 (Year: 2007).*

Machine Translation of KR-200430890-Y1, Nov. 2006 (Year: 2006).*

Laminated Glass, Jun. 2015 (Year: 2015).*

Machine Translation of JP-2005104819-A, Apr. 2005 (Year: 2005).*

Machine Translation of WO-2013128103-A1, Sep. 2013 (Year: 2013).*

Maa, Theory and Design of Microperforated Panel Sound-Absorbing Constructions, 1975, Scientia Sincia, vol. XVIII, No. I (Year: 1975).*

Fuchs et al., Acrylic-glass Sound Absorbers in the Plenum of the Deutscher Bundestag, 1997, Applied Acoustics, vol. 51, No. 2, p. 211-217 (Year: 1997).*

Maa, Potential of microperforated panel absorber, 1998, The Journal of the Acoustical Societyof America, vol. 104 (Year: 1998).*

Min et al., Design of compact micro-perforated membrane absorbers for polycarbonate pane in automobile, 2013, Applied Acoustics, vol. 74, pp. 622-627 (Year: 2013).*

Qian et al., Investigation on micro-perforated panel absorber with ultra-micro perforations, 2013, Applied Acoustics, vol. 74, pp. 622-627 (Year: 2013).*

(56) References Cited

OTHER PUBLICATIONS

Nocke et al., Micro-perforated sheets as day-light ceilings, 2014, Inter-noise 2014 (Year: 2014).*

Nocke et al., Light, transparency and sound absorption, 2016, Acoustics 2016 (Year: 2016).*

Nocke et al., Transparent micro-perforated sound absorbers, 2016, Proceedings of the 22nd International Congress on Acoustics (Year: 2016).*

Prasetiyo et al., Study on inhomogeneous perforation thick micro-perforated panel sound absorbers, Dec. 2016, Journal of Mechanical Engineering and Sciences (Year: 2016).*

International Search Report and Written Opinion of the International Searching Authority; PCT/US2018/029494; dated Sep. 28, 2018; 10 Pages; European Patent Office.

Maa, "Potential of Micro-Perforated Panel Absorber," The Journal of Acoustical Society of America, vol. 104, pp. 2861-2866, 1998.

Nocke et al; "Micro-Perforated Sound Absorbers in Stretched Materials," Proceedings of Acoustics, Gold Coast, Australia, 2011; 5 Pages.

Sakagami et al ; "Sound Absorption Characteristics of a Single Microperforated Panel Absorber Backed By a Porous Absorbent Layer," Acoustics Australia, vol. 39, pp. 95-100, 2011.

Sakagami et al; "Double-Leaf Microperforated Panel Space Absorbers: A Revised Theory and Detailed Analysis," Applied Acoustics, pp. 703-709, 2009.

Tayong et al; "On the Variations of Acoustic Absorption Peak With Flow Velocity in Mirco-Perforated Panels at High Level of Excitation"; The Journal of the Acoustical Society of America, vol. 127, No. 5, pp. 2875-2882; (2020).

"Laminated Glasses", Available at: https://en.wikipedia.org/wiki/Laminated_glass, Retrieved on May 26, 2021, pp. 6., May 26, 2021.

India Patent Application No. 201917043262, Office Action dated Apr. 22, 2021, 6 pages, Indian Patent Office.

Chinese Patent Application No. 201880028107.3, Office Action dated Sep. 17, 2021, 9 pages (5 pages of English Translation and 4 pages of Original Document), Chinese Patent Office.

* cited by examiner

MICRO-PERFORATED GLASS LAMINATES AND METHODS OF MAKING THE SAME

CROSS-REFERENCE TO RELATED APPLICATIONS

This application claims the benefit of priority under 35 U.S.C. § 371 of International Application No. PCT/US2018/029494, filed on Apr. 26, 2018, which claims the benefit of priority to U.S. Provisional Application No. 62/490,253 filed on Apr. 26, 2017, the content of which is relied upon and incorporated herein by reference in its entirety.

FIELD

The described embodiments relate generally to micro-perforated laminate systems and methods for noise abatement, and methods of making micro-perforated laminate systems. In particular, embodiments relate to micro-perforated glass laminate systems and methods for noise abatement.

BACKGROUND

Glass and glass ceramic materials are highly desirable architectural products owing to one or more of superior optical attributes, scratch and corrosion resistance, durability, waterproof, aesthetic quality, fire resistance, etc. For example, unlike polymeric materials such as polycarbonate, glass does not "yellow" over time, has high strength and scratch resistance, and may be cleaned using UV methods. However, the high density and acoustic impedance of glass leads to high acoustic reflections (e.g., echo), poor speech intelligibility, and a low noise reduction coefficient (NRC) which limits its widespread use in architectural applications particularly. Ordinary glass has nearly no sound absorption coefficient (NRC about 0.05) leading to undesirably long reverberation time and poor acoustic environment when used.

Establishing optimal room acoustics has been a growing need for many interior architectural applications including, for example, open office workspace, hospitals, classrooms, airports, automotive applications, and more. Not only can continuous exposure to sound levels greater than 85 decibels (dB) lead to hearing loss, but even noise at much lower level can be a significant distraction and lead to reduced productivity, reduced ability to concentrate or rest, and in general make a room acoustically unpleasant.

Current approaches for sound absorbing include the use of acoustic foam, fibrous materials, and other non-transparent, non-glass materials. A technical solution to improve acoustic properties, including NRC rating, of glass is highly desirable to be used in various operative environments where noise control is desirable.

BRIEF SUMMARY

The present disclosure provides micro-perforated glass or glass-ceramics laminate systems that may be used for noise abatement and acoustic control, while keeping desirable properties of glass and glass ceramics (e.g, superior optical attributes, scratch and corrosion resistance, durability, waterproof properties, aesthetic quality, fire resistance, non-yellowing, high strength, and ability to be cleaned using UV methods, etc.).

Some embodiments of present disclosure are directed to a micro-perforated glass or glass-ceramics laminate, comprising: a first substrate laminated to a second substrate by a first polymer interlayer, wherein the first and the second substrates are independently selected from glass or glass-ceramics, and a plurality of micro-perforations, each of the plurality of micro-perforations extending through the first substrate, the first polymer interlayer, and the second substrate.

In some embodiments, the embodiments of any of the preceding paragraphs may further include a first substrate, a first polymer interlayer, a second substrate, a second polymer interlayer, and a third substrate laminated to the second substrate by the second polymer interlayer, wherein the third substrate is selected from glass or glass-ceramics.

In some embodiments, the embodiments of any of the preceding paragraphs may further include the Noise Reduction Coefficient (NRC) of the micro-perforated glass laminate between 0.3 and 1.

In some embodiments, the embodiments of any of the preceding paragraphs may further include the largest dimension of each of the plurality of micro-perforations in a plane of the micro-perforated glass or glass-ceramics laminate ranging from 20 um to 1000 um.

In some embodiments, the embodiments of any of the preceding paragraphs may further include the ratio of thickness of the glass or glass-ceramics laminate to the largest dimension of each of the plurality of micro-perforations in the plane of the micro-perforated glass or glass-ceramics laminate between 0.1 and 20.

In some embodiments, the embodiments of any of the preceding paragraphs may further include the spacing between adjacent micro-perforations in the plane of the micro-perforated glass or glass-ceramics laminate ranging from 40 um to 5000 um.

In some embodiments, the embodiments of any of the preceding paragraphs may further include the porosity of the micro-perforations in the glass or glass-ceramics laminate ranging from 0.5% to 20%.

In some embodiments, the embodiments of any of the preceding paragraphs may further include the shape of the micro-perforations through the first substrate, the first polymer interlayer, and the second substrate selected from the group consisting of cylindrical, conical, hour-glass, and combinations thereof.

In some embodiments, the embodiments of any of the preceding paragraphs may further include wherein the largest dimension of each of the plurality of micro-perforations is uniform or non-uniform.

In some embodiments, the embodiments of any of the preceding paragraphs may further include wherein the spacing between adjacent micro-perforations is uniform or non-uniform.

In some embodiments, the embodiments of any of the preceding paragraphs may further include wherein the first and second polymer interlayers are individually selected from the group consisting of polyvinyl butyral (PVB), ethylene-vinyl acetate, ionomers, polyurethanes, and polycarbonates. In some embodiments, the first and second polymer interlayers are optically transparent, translucent, frosted, or colored. In some embodiments, the first and second polymer interlayers comprise a single layer or multiple layers.

In some embodiments, a method of forming a micro-perforated glass or glass-ceramics laminate comprises: laminating a polymer interlayer between a first substrate and a second substrate, wherein the first and the second substrates are independently selected from glass or glass-ceramics, to form a glass or glass-ceramics laminate having a thickness, forming a plurality of openings in the first substrate, forming a plurality of openings in the second substrate, and forming a plurality of openings in the polymer interlayer, wherein the plurality of openings in each of the first substrate, the polymer interlayer and the second substrate are aligned to form a plurality of micro-perforations through the thickness of the glass or glass-ceramics laminate.

In some embodiments, the embodiments of any of the preceding paragraphs may further include wherein the Noise Reduction Coefficient (NRC) of the micro-perforated glass or glass-ceramics laminate is between 0.3 and 1.

In some embodiments, the embodiments of any of the preceding paragraphs may further include laminating the polymer interlayer between the first substrate and the second substrate before forming the plurality of openings in the first substrate, the second substrate and the polymer interlayer.

In some embodiments, the embodiments of any of the preceding paragraphs may further include laminating the polymer interlayer between the first substrate and the second substrate after forming the plurality of openings in the first substrate, the second substrate and the polymer interlayer.

In some embodiments, the embodiments of any of the preceding paragraphs may further include forming the plurality of openings in the first and second substrates comprising forming a plurality of damage tracks with a first laser beam; and etching the first and second substrates having the plurality of damage tracks in an acid solution.

In some embodiments, the embodiments of any of the preceding paragraphs may further include laminating the polymer interlayer between the first substrate and the second substrate to form the glass or glass-ceramics laminate, forming the plurality of damage tracks in the first substrate and the second substrate with the first laser beam, after forming the plurality of damage tracks, etching the first and second substrates in the acid solution to form the plurality of openings in the first substrate and the second substrate from the plurality of damage tracks, and after forming the glass or glass-ceramics laminate and after forming the plurality of openings in the first and second substrates, removing a portion of the polymer interlayer to form the micro-perforated glass or glass-ceramics laminate.

In some embodiments, the embodiments of any of the preceding paragraphs may further include forming the plurality of damage tracks in the first and second substrates with the first laser beam, forming the plurality of openings in the polymer interlayer with a second laser beam, etching the first and second substrates having the plurality of damage tracks in the acid solution to form the plurality of openings in the first and second substrates, and after etching, laminating the polymer interlayer between the first and second substrates while the plurality of openings in the first and second substrates and the plurality of openings in the polymer interlayer are aligned.

In some embodiments, the embodiments of any of the preceding paragraphs may further include forming the plurality of openings in the polymer interlayer performed by a process selected from the group consisting of solvent etching, laser drilling, thermal discharge, physical puncturing, mechanical drilling, and combinations thereof.

In some embodiments, the embodiments of any of the preceding paragraphs may further include forming the plurality of openings in the first and second substrates performed by a process selected from the group consisting of acid etching, laser drilling, laser drilling followed by acid etching, mechanical drilling, and combinations thereof.

In some embodiments, the embodiments of any of the preceding paragraphs may further include the plurality of damage tracks grouped into a plurality of clusters, each cluster including more than one damage track, wherein damage tracks within each cluster merge into a single micro-perforation during etching the first and second substrates, and each cluster forms a discrete micro-perforation.

In some embodiments, the embodiments of any of the preceding paragraphs may further include each of the plurality of damage tracks forming a discrete micro-perforation during etching the first and second substrates.

In some embodiments, the embodiments of any of the preceding paragraphs may further include a micro-perforated glass or glass-ceramics laminate formed by a method comprising laminating a polymer interlayer between a first substrate and a second substrate, wherein the first and the second substrates are independently selected from glass or glass-ceramics, to form a glass or glass-ceramics laminate having a thickness, forming a plurality of openings in the first substrate, forming a plurality of openings in the second substrate, and forming a plurality of openings in the polymer interlayer, wherein the plurality of openings in each of the first substrate, the polymer interlayer and the second substrate are aligned to form a plurality of micro-perforations through the thickness of the glass or glass-ceramics laminate.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
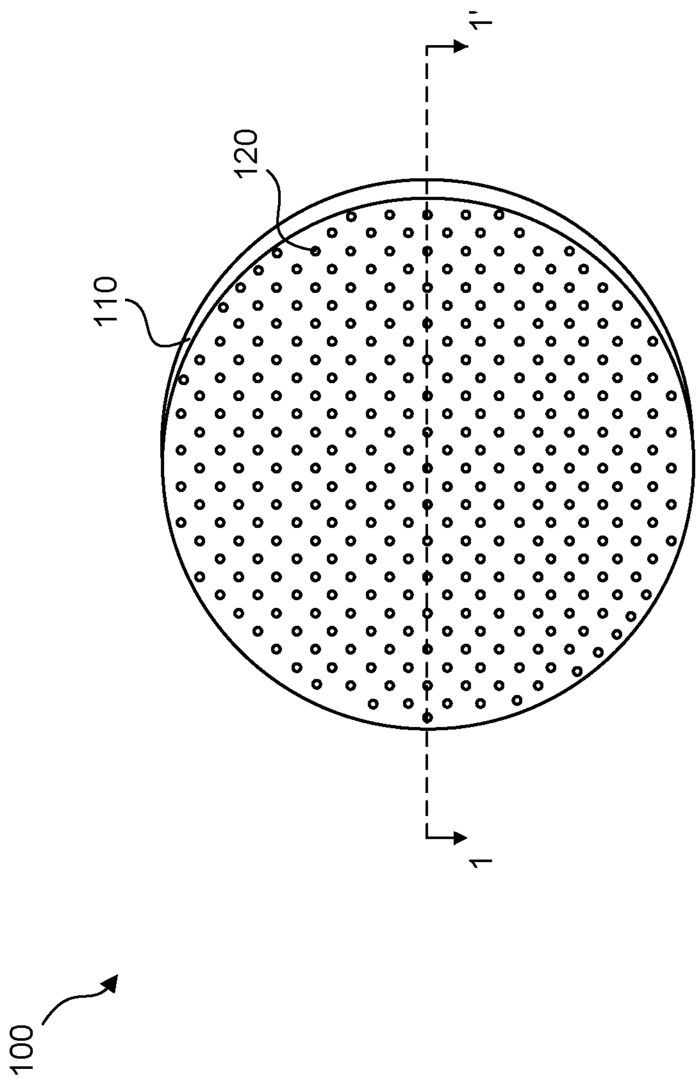
FIG. 1 shows a perspective view of a micro-perforated glass or glass-ceramics laminate according to an embodiment.

Addressing room acoustics is challenging as it involves both architectural design and engineering in addition to acoustic science and principles. Micro-perforated laminates in general may form a resonant sound absorbing system, based on the Helmholtz resonance principle.

The present disclosure relates to the development of transparent, micro-perforated glass and glass ceramic laminates for enhanced safety while achieving high acoustic absorption. The combination of safety and acoustic absorption (NRC>0.3) is highly desirable by architects and acoustic consultants for several interior applications such as automotive interiors, office furniture etc.

In some embodiments, the micro-perforated glass or glass ceramic laminate is configured to decrease reverberation time of an operative environment. As used herein, "operative environment" may include an enclosed or semi-enclosed environment that requires a certain acoustic environment. For example, conference rooms, offices, schools, hospitals, manufacturing facilities, clean rooms (food, pharmaceutical), museums, historical buildings, restaurants, etc., may all be "operative environments". In some embodiments, the micro-perforated glass or glass ceramic laminate is integrated in a lighting solution, for example, a lighting fixture in a ceiling or a wall. In this regard, the transparent nature of the micro-perforated glass or glass ceramic laminates is used to allow for light, while taking advantage of the noise reduction properties of the glass or glass ceramic laminate. Natural air spacing behind the glass or glass-ceramic laminate (in the lighting fixture) may also be advantageous from a noise reduction perspective.

In some embodiments, the micro-perforated glass or glass ceramic laminate includes a strengthened glass or glass ceramic. In some embodiments, for a strengthened glass, the surface compression is balanced by a tensile stress region in the interior of the glass. Surface compressive stress ("CS") greater than 750 MPa and compressive stress layer depths (also called depth of compression, or "DOC") greater than 40 microns are readily achieved in some glasses, for example, alkali aluminosilicate glasses, by chemically strengthening processes (e.g., by ion exchange processes). DOC represents the depth at which the stress changes from compressive to tensile.

In some embodiments, the micro-perforated glass or glass-ceramics laminate includes a non-strengthened glass, for example, a soda-lime glass. In some embodiments, the micro-perforated glass or glass-ceramics laminate includes strengthened glass or glass ceramic that is mechanically, thermally or chemically strengthened. In some embodiments, the strengthened glass or glass ceramic may be mechanically and thermally strengthened, mechanically and chemically strengthened or thermally and chemically strengthened. A mechanically-strengthened glass or glass ceramic may include a compressive stress layer (and corresponding tensile stress region) generated by a mismatch of the coefficient of thermal expansion between portions of the glass or glass ceramic. A chemically-strengthened glass or glass ceramic may include a compressive stress layer (and corresponding tensile stress region generated by an ion exchange process). In such chemically strengthened glass and glass ceramics, the replacement of smaller ions by larger ions at a temperature below that at which the glass network can relax produces a distribution of ions across the surface of the glass that results in a stress profile. The larger volume of the incoming ion produces a CS on the surface portion of the substrate and tension in the center of the glass or glass ceramic. In thermally-strengthened glass or glass ceramics, the CS region is formed by heating the glass or glass ceramic to an elevated temperature above the glass transition temperature, near the glass softening point, and then cooling the surface regions more rapidly than the inner regions of the glass or glass ceramic. The differential cooling rates between the surface regions and the inner regions generates a residual surface CS, which in turn generates a corresponding tensile stress in the center region. In one or more embodiments, the glass substrates exclude annealed or heat strengthened soda lime glass. In one or more embodiments, the glass substrates include annealed or heat strengthened soda lime glass In some embodiments, the glass or glass ceramic may have surface compressive stress of between about 100 MPa and about 1000 MPa, between about 100 MPa and about 800 MPa, between about 100 MPa and about 500 MPa, between about 100 MPa and about 300 MPa, or between about 100 MPa and about 150 MPa. In some embodiments, the DOC may be between 0.05*t and about 0.21*t (where t is thickness of the glass or glass ceramic in micrometers). In some embodiments, DOC may be in the range from about 0.05*t to about 0.2*t, from about 0.05*t to about 0.18*t, from about 0.05*t to about 0.16*t, from about 0.05*t to about 0.15*t, from about 0.05*t to about 0.12*t, from about 0.05*t to about 0.1*t, from about 0.075*t to about 0.21*t, from about 0.1*t to about 0.21*t, from about 0.12*t to about 0.21*t, from about 0.15*t to about 0.21*t, from about 0.18*t to about 0.21*t, or from about 0.1*t to about 0.18*t.

In some embodiments, the micro-perforated glass or glass-ceramics laminate includes a strengthened glass substrate. In some embodiments, the micro-perforated glass or glass-ceramics laminate may have a particular dicing pattern of the glass. In some embodiments, the dicing pattern may be that of a safety glass. In some embodiments, the glass may be strengthened to have an optimum average size and size distribution of broken pieces, average angles of sharp point and distributions around those average angles, and distance of ejection upon breakage such that safety risks are reduced.

In some embodiments, Noise Reduction Coefficient (NRC) is a metric used to evaluate the acoustic absorption effectiveness of a surface of an absorber, upon sound striking the surface of the absorber. It may be calculated by taking the arithmetic mean of the sound absorption coefficients at 250, 500, 1000 and 2000 Hz. In some embodiments, a micro-perforated glass or glass-ceramics laminate has an NRC of between about 0.3 and 1, or between about 0.3 and 0.8.

In some embodiments, a micro-perforated glass or glass-ceramics laminate has a predetermined sound absorption coefficient over a predetermined frequency band between 250 Hz and 6000 Hz, or between 250 Hz and 20,000 Hz. In some embodiments, the micro-perforated glass or glass-ceramics laminate may be "tuned" to absorb particular frequencies of interest, for example, in a machinery room or for a HVAC application, for example.

In some embodiments, the weighted sound absorption coefficient ($\alpha_w$) is a metric used to evaluate the acoustic absorption effectiveness of a surface of an absorber, upon sound striking the surface of the absorber. The weighted sound absorption coefficient (αw) is a result from comparison between the sound absorption coefficient values at standard frequencies and reference curve in accordance with ISO 11654:1997. The standard frequencies are 250, 500, 1000, 2000 and 4000 Hz. In some embodiments, a micro-perforated glass or glass-ceramics laminate has a weighted sound absorption coefficient ($\alpha_w$) between about 0.3 and 1, or between about 0.3 and 0.8.

In some embodiments, the micro-perforated glass or glass-ceramics laminate further includes a backing wall operatively connected to the micro-perforated glass or glass-ceramics laminate. As used herein, "operatively connected" may include a direct connection or indirect connection, or acoustic connection such that the micro-perforated glass or glass-ceramics laminate and backing wall work together to increase noise abatement. In some embodiments, the backing wall is an existing, substantially rigid structure in an operative environment (e.g., walls or ceiling in a room). In some embodiments, the backing wall may or may not contribute to acoustic echo. Advantageously, the backing wall may be a rigid or hard surface, so as to not change the acoustic performance of the micro-perforated glass or glass-ceramics laminate. In some embodiments, the micro-perforated glass or glass-ceramics laminates may be hung in front of the backing wall or placed in front of the back wall using fixtures, for example.

In some embodiments, the micro-perforated glass or glass-ceramics laminate systems comprise a single laminate. A "cavity spacing", as referred to herein, may be defined as the air spacing of the laminate from a backing wall and is 1 mm, 3 mm, 5 mm, 10 mm, 20 mm, 25 mm, 50 mm, 100 mm, 250 mm, 500 mm, 1000 mm, 2000 mm, 5000 mm, 10000 mm, or any range having any of these two values as endpoints. For example, a cavity spacing of 3 mm and 25 mm may be used.

In some embodiments, the micro-perforated glass or glass-ceramics laminate systems comprise multiple laminates. In multiple-laminate systems, there may be two types of cavity spacing, namely, laminate-to-laminate cavity spacing ($CS_{ll}$) and laminate-to-backwall cavity spacing ($CS_{lb}$). In some embodiments, laminate-to-laminate cavity spacing ($CS_{ll}$) may be defined as the distance between the laminates in a direction perpendicular to the plane of the laminate, and laminate-to-backwall cavity spacing ($CS_{lb}$) may be defined as the distance between the inner laminate and the backing wall, in a direction perpendicular to the plane of the laminate.

In some embodiments, laminate-to-laminate cavity spacing ($CS_{ll}$) or the laminate-to-backwall cavity spacing ($CS_{lb}$) may be adjusted depending on the application or the frequency or a range of frequencies that the end-user desires to absorb, for example, in a given room. The laminate-to-laminate cavity spacing and laminate-to-backwall cavity spacing may have similar or different values. In some embodiments, the cavity spacing has an effect on the peak absorption frequency.

In some embodiments, the micro-perforated glass or glass-ceramics laminate of present disclosure includes a coating, such as a photochromic, thermal control, electrochromic, low emissivity, UV coatings, anti-glare, hydrophilic, hydrophobic, anti-smudge, anti-fingerprint, anti-scratch, anti-reflective, ink-jet decorated, screen-printed, anti-splinter, etc. In some embodiments, the micro-perforations are not blocked by the coating. In some embodiments, the interior of the micro-perforations are not coated. In some embodiments, a portion of the micro-perforations are blocked by the coating. In some embodiments, the glass or glass-ceramic laminate includes an anti-microbial component.

In some embodiments, the micro-perforated glass or glass-ceramics laminate of the present disclosure may be of uniform thickness, or non-uniform thickness. In some embodiments, the micro-perforated glass or glass-ceramics laminate may be substantially planar. In some embodiments, the micro-perforated glass or glass-ceramics laminate may be curved, for example, or have a complex shape. In some embodiments, the micro-perforated glass or glass-ceramics laminate may be a shape, for example, rectangular, round, etc. In some embodiments, the micro-perforated glass or glass-ceramics laminate may be flexible. In some embodiments, the micro-perforated glass or glass-ceramics laminate may be substantially rigid. In some embodiments, the geometric attributes of the micro-perforated glass or glass-ceramics laminate (e.g., micro-perforation diameter, micro-perforation shape, pitch, thickness, etc.) and the sound absorption coefficient of the micro-perforated glass or glass-ceramics laminate may be tuned to achieve desired room acoustics.

For example, the reverberation time (e.g., echo) in the room is inversely proportional to the sound absorption coefficient of the material in the room using the formula:

$$RT_{60} = 0.161 \frac{V}{\sum_i \alpha_i S_i}$$

where V is the volume of the room, S is the surface area and a is the sound absorption coefficient of the material. The reverberation time may be defined as the time it takes for the sound to decay to a given level in an environment. Higher reverberations can be translated to echo. Thus, because conventional glass has near zero sound absorption, this results in a long reverberation time leading to loss of speech intelligibility and an unpleasant acoustic environment. To minimize reflection and achieve good absorptive properties, the micro-perforated glass or glass-ceramics laminate of present disclosure may be configured to achieve an acoustic resistance (R) along the same order of magnitude as the characteristic impedance of air and a small acoustic mass reactance (M). An optimal acoustic resistance can be obtained by fabricating micro-perforations using the manufacturing process described below, to achieve the desired acoustic requirements as noted in equations below:

$$R = \frac{32\eta t}{\sigma\rho c d^2}k_r;\ k_r = \left[1+\frac{k^2}{32}\right]^{\frac{1}{2}} + \frac{\sqrt{2}}{32}k\frac{d}{t}$$

$$M = \frac{t}{\sigma c}k_m;\ k_m = \left[1+\frac{k^2}{2}\right]^{-\frac{1}{2}} + 0.85\frac{d}{t}$$

where d is the micro-perforation diameter, t is thickness of the micro-perforated glass or glass-ceramics laminate, c is the speed of sound in air, ρ is the air density, σ is the porosity ratio, and η is the viscosity of the air. The perforation constant, k, may be defined in terms of the micro-perforation diameter and viscosity of the air as:

$$k = d\sqrt{\frac{\omega\rho}{4\eta}}$$

Subsequently, the acoustic impedance of the micro-perforation is calculated as:

$$Z=R+j\omega M-j\cot(\omega D/c)$$

where ω is the angular frequency, D is the cavity spacing and c is the speed of sound in air.

The acoustic resistance and mass reactance can be then utilized to predict the acoustic absorption performance of the micro-perforated glass or glass-ceramics laminate.

Some embodiments described herein have at least one of many advantages listed below:

i. Higher safety—In the glass or glass-ceramics laminate system, upon breakage, the glass would not shatter due to the presence of the polymer interlayer.

ii. High acoustic absorption—The NRC of the micro-perforated glass or glass-ceramics laminates is greater than 0.3. In addition to developing micro-perforation features through the glass or glass-ceramics laminate, polymer materials with high damping loss factor can be utilized to increase the acoustic absorption.

iii. Thin glass or glass-ceramics laminates—The ability to manufacture thin glass or glass-ceramics laminates while ensuring safety requirements. The desire to manufacture thin glass or glass-ceramics laminates would be appreciated in particular, but not limited to, automotive OEMS for finding the optimal balance between acoustic absorption and weight savings.

iv. Glass and other Glass compositions—Transparent, scratch-resistant materials are highly desirable for architectural and automotive interior applications. Various types of glasses and glass compositions can be processed including strengthened or treated glass. The glass substrates can be coated with different attributes such as thermal coating, photo chromic, UV, electro-chromic etc.

v. Choice of polymer interlayer(s)—The poly vinyl butyral (PVB) polymer interlayer(s) can be of different colors or transparencies for enhanced aesthetic, decorative applications and/or privacy applications. The polymer interlayer can also be composed of multiple layers for aesthetic reasons or functional reasons such as stiffness and thickness. Alternatives to PVB such as ethylene-vinyl acetate (EVA) and ionomers may further extend applications and product lifespan.

vi. Process flexibility—Not critical to chemically/thermally strengthening post etching.

vii. Recyclability—The product may be recyclable. Equipment and processes exist to recycle windshields with PVB interlayers and may be similarly applied at the end of the product use or lifecycle.

viii. Design flexibility—The micro-perforated glass or glass-ceramics laminates can be planar or could be curved for certain applications, as desired. The present methods disclosed allow forming micro-perforated laminated glass with decorative patterns such as logos, flower shapes etc. or regular patterns such as rectangular grid, square grid, etc. for functional or decorative applications.

FIG. 1 shows a perspective view 100 of a micro-perforated glass or glass-ceramics laminate 110, including a plurality of micro-perforations 120, each of the plurality of micro-perforations extending through the thickness of the glass or glass-ceramics laminate.

In some embodiments, the micro-perforated glass or glass-ceramics laminate 110 may be planar. In some embodiments, the micro-perforated glass or glass-ceramics laminate 110 may be non-planar. When a dimension, for example the diameter of a circular micro-perforation, is measured relative to the "plane" of a non-planar surface, the dimension should be measured relative to the plane tangent to the surface of the non-planar micro-perforated glass or glass-ceramics laminate where the measurement is taken.

In some embodiments, the micro-perforated glass or glass-ceramics laminate 110 comprises the first substrate, the first polymer interlayer, the second substrate, a second polymer interlayer, and a third substrate laminated to the second substrate by the second polymer interlayer, wherein the third substrate is selected from glass or glass-ceramics.

In some embodiments, the type of glass or glass-ceramics and thickness may be allowed to vary in combination with the thickness of the polymer interlayer to obtain the desired rigidity and safety ratings. For example, using photostructurable glass and UV processing followed by etching to generate openings in glass.

In some embodiments, each of the plurality of micro-perforations 120 have a largest dimension in a plane of the micro-perforated glass or glass-ceramics laminate 110. As referred to herein, "largest dimension" is the length of the longest straight line that may be drawn across a micro-perforation 120 in the plane of a surface of the laminate. For a circle, the "largest dimension" is the diameter. For a square or rectangle, the "largest dimension" is the length of a diagonal line connecting two opposite corners. For an ellipse, the "largest dimension" is the length of the major axis.

In some embodiments, the "thickness" of the micro-perforated glass or glass-ceramics laminate 110, as referred to herein, may be defined as the dimension of the glass or glass-ceramics laminate perpendicular to the plane of the laminate.

In some embodiments, the "spacing" between adjacent micro-perforations 120, as referred to herein, may be defined as the shortest distance between the geometrical centers of adjacent micro-perforations along a plane of the micro-perforated glass or glass-ceramics laminate. In some embodiments, the spacing between adjacent micro-perforations 120 is uniform in each predetermined direction. For example, a square or rectangular array of micro-perforations exhibits such uniformity, because the spacing in any given direction is uniform, even though the spacing in different directions (such as the side and diagonal of a square) may be different. In some embodiments, the spacing between adjacent micro-perforations 120 may be non-uniform.

In some embodiments, the "aspect ratio" may be defined as the ratio of the thickness of the micro-perforated glass or glass-ceramics laminate 110 to the largest dimension of each of plurality of the micro-perforations 120 in a plane of the micro-perforated glass or glass-ceramics laminate 110. In some embodiments, the aspect ratio is less than 25, or is between about 0.05 and 25, between about 0.1 and 20, between about 1 and 15, between about 1 and 10, between about 5 and 20, between about 5 and 15, between about 5 and 10, between about 10 and 20, or between about 10 and 15, or about 1, 2, 3, 4, 5, 6, 7, 8, 9, 10, 11, 12, 13, 14, 15, 16, 17, 18, 19, 20, 21, 22, 23, 24 or 25, or any range having any of these two values as endpoints. Other aspect ratios may be used.

In some embodiments, the thickness of the micro-perforated glass or glass-ceramics laminate 110 is between about 0.1 mm and 6 mm, between about 0.2 mm and 3 mm, between about 0.2 mm and 2 mm, between about 0.3 mm and 3 mm, between about 0.3 mm and 2 mm, between about 0.3 mm and about 1 mm. In some embodiments, the thickness of the micro-perforated glass or glass-ceramics laminate 110 may be 0.1 mm, 0.5 mm, 1 mm, 2 mm, 3 mm, 4 mm, 5 mm, 6 mm, 8 mm, or 10 mm, or any range having any of these two values as endpoints. Other thicknesses may be used.

In some embodiments, the largest dimension of the micro-perforations 120 in a plane of the micro-perforated glass or glass-ceramics laminate 110 is uniform across all micro-perforations. In some embodiments, the largest dimension of the micro-perforations 120 in a plane of the micro-perforated glass or glass-ceramics laminate 110 may be non-uniform.

In some embodiments, the largest dimension of the micro-perforations 120 may be 20 um, 40 um, 60 um, 80 um, 100 um, 150 um, 200 um, 250 um, 300 um, 350 um, 400 um, 450 um, 500 um, 550 um, 600 um, 700 um, 800 um, 900 um, or 1000 um, or any range having any of these two values as endpoints. For example, the largest dimension of the micro-perforations 120 in a plane of the micro-perforated glass or glass-ceramics laminate 110 may be between about 20 um and about 1000 um, between about 20 um and about 800 um, between about 20 um and about 500 um, between about 20 um and about 100 um, and between about 20 um and about 50 um.

In some embodiments, the spacing between adjacent micro-perforations in the plane of the micro-perforated glass or glass-ceramics laminate 110 is 40 um, 60 um, 80 um, 100 um, 200 um, 400 um, 600 um, 800 um, 1000 um, 2000 um, 3000 um, 4000 um, or 5000 um, or any range having any of these two values as endpoints. For example, the spacing between adjacent micro-perforations in the plane of the micro-perforated glass or glass-ceramics laminate 110 may be between about 40 um and about 5000 um, between about 80 um and about 5000 um, between about 200 um and 5000 um, between about 500 um and 5000 um.

In some embodiments, the "porosity" of the micro-perforated glass or glass-ceramics laminate 110, as referred to herein, may be defined as the ratio of the cumulative volume of each of the plurality of micro-perforations in the glass or glass-ceramics laminate to the total volume, including micro-perforations, of the micro-perforated glass or glass-ceramics laminate 110. In some embodiments, the porosity of the micro-perforations in the micro-perforated glass or glass-ceramics laminate 110 may be 0.5%, 1%, 2%, 3%, 4%, 5%, 6%, 7%, 8%, 9,%, 10%, 12%, 14%, 16%, 18%, 20%, or 25%, or any range having any of these two values as endpoints. For example, the porosity of the micro-perforations in the micro-perforated glass or glass-ceramics laminate 110 may range from about 0.5% to about 20%, from about 0.5% to about 15%, and from about 0.5% to about 10%.

In some embodiments, the micro-perforations 120 are positioned at uniform intervals along the glass or glass-ceramics laminate. In some embodiments, the micro-perforations are distributed with uniform density along the glass or glass-ceramics laminate. In some embodiments, the spacing may be of non-uniform intervals. In some embodiments, the micro-perforations 120 are distributed with non-uniform density. In some embodiments, non-uniform density or spacing may decrease optical distortion, or be used in decorative applications, for example. In some embodiments, acoustic performance may be controlled through the mean distance between micro-perforations to be substantially uniform to maximize sound absorption at a certain frequency. In some embodiments, spacing may be varied across the glass or glass-ceramics laminate, for example, to achieve broader absorption spectrum. In some embodiments, the micro-perforations are distributed with non-uniform densities, which can find various applications, for example, logos, text, flower patterns, etc.

Figures 2A, 2B:
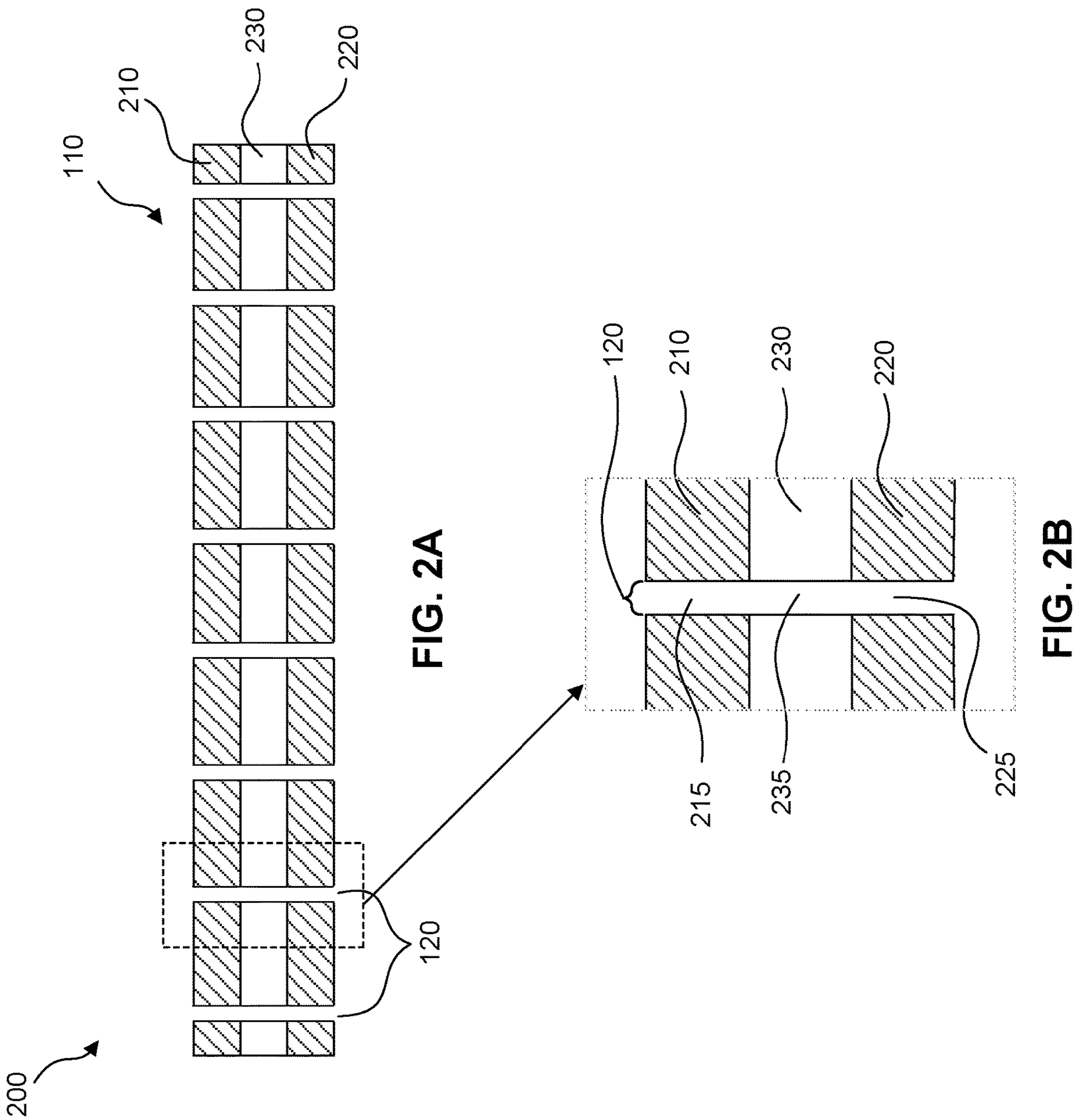
FIG. 2A shows a cross-section of a micro-perforated glass or glass-ceramics laminate along the plane 1-1' shown in FIG. 1.
FIG. 2B shows an enlarged cross-section view of a portion of the micro-perforated glass or glass-ceramics laminate.

FIG. 2A shows cross-section view 200 of a micro-perforated glass or glass-ceramics laminate 110 along the plane 1-1' shown in FIG. 1. As viewed along the 1-1', the micro-perforated glass or glass-ceramics laminate 110 includes a first substrate 210, a first polymer interlayer 230, and a second substrate 220. In some embodiments, the micro-perforated glass or glass-ceramics laminate 110 comprises a first substrate 210 laminated to a second substrate 220 by a first polymer interlayer 230, wherein the first and the second substrates are independently selected from glass or glass-ceramics, and a plurality of micro-perforations 120, each of the plurality of micro-perforations 120 extending through the first substrate 210, the first polymer interlayer 230, and the second substrate 220. FIG. 2B shows an enlarged view of a portion of the micro-perforated glass or glass-ceramics laminate 110 along the plane 1-1'.

In some embodiments, each of the plurality of micro-perforations 120 comprise an opening 215 through the first substrate 210, an opening 225 through the second substrate 220 and an opening 235 through the first polymer interlayer 230, as shown in FIG. 2B.

In some embodiments, polymer interlayer thickness may be varied to accommodate the desired rigidity and safety ratings as well as acoustic design requirements. The polymer interlayer may be a single layer or multiple layers.

In some embodiments, the polymer interlayer(s) may be selected from the group consisting of polyvinyl butyral (PVB), ethylene-vinyl acetate (EVA), ionomers, or polycarbonate-thermoplastic polyurethanes. These polymers may or may not be soluble in a solvent. Product lifespan and appearance may be impacted by the choice of the polymer interlayer. In some embodiments, the polymer interlayer(s) may be optically transparent, colored, frosted, or translucent.

Some embodiments of present disclosure are directed to a method of forming a micro-perforated glass or glass-ceramics laminate. The method comprises laminating a polymer interlayer 230 between a first substrate 210 and a second substrate 220, wherein the first and the second substrates are independently selected from glass or glass-ceramics, to form a glass or glass-ceramics laminate having a thickness. The method further comprises forming a plurality of openings 215 in the first substrate 210, forming a plurality of openings 225 in the second substrate 220, and forming a plurality of openings 235 in the polymer interlayer 230, wherein the plurality of openings in each of the first substrate, the polymer interlayer and the second substrate are aligned to form a plurality of micro-perforations through the thickness of the glass or glass-ceramics laminate. These method steps may be performed in any order, as illustrated in various exemplary embodiments described herein with different ordering of the steps. And, various techniques may be used to form the openings. The NRC of the micro-perforated glass or glass-ceramics laminate formed is between 0.3 and 1.

Figure 3:
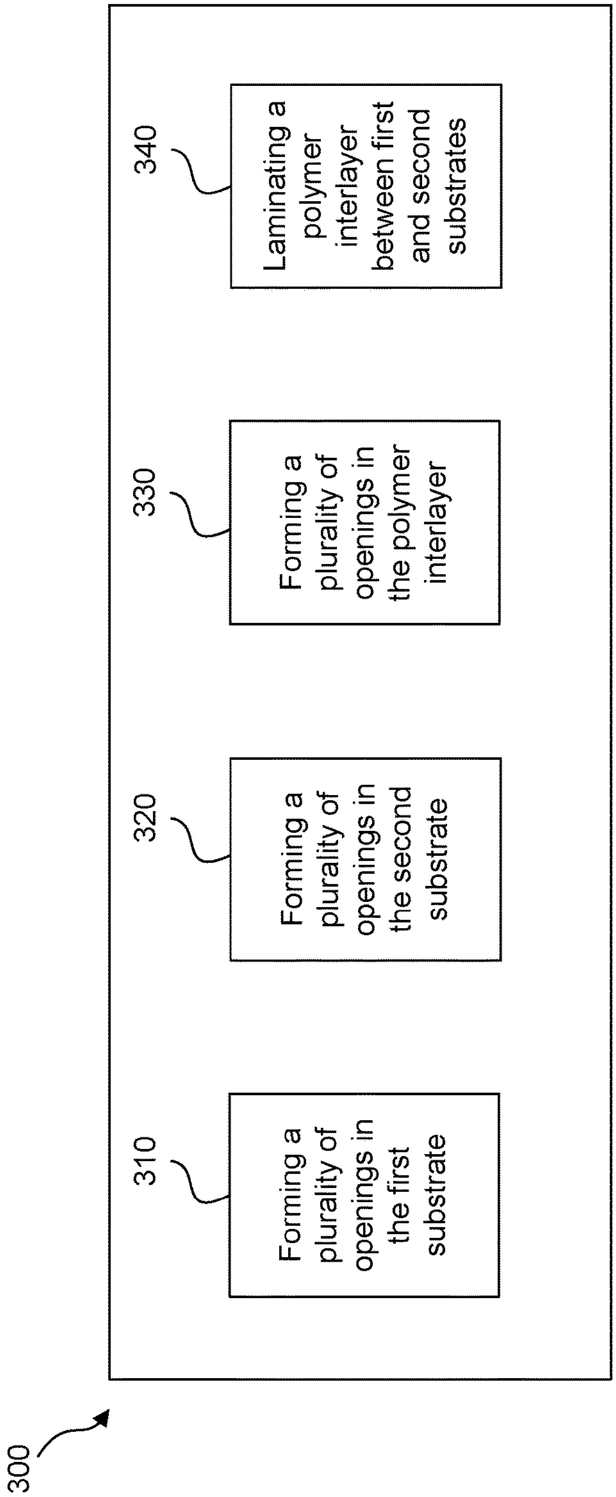
FIG. 3 shows process steps to form a micro-perforated glass or glass-ceramics laminate according to an embodiment.

The method is generally illustrated in FIG. 3. In some embodiments, the method of forming a micro-perforated glass or glass-ceramics laminate 110 comprises the following steps, in no specific order:

Step 310: forming a plurality of openings in the first substrate;

Step 320: forming a plurality of openings in the second substrate;

Step 330: forming a plurality of openings in the polymer interlayer;

Step 340: laminating the polymer interlayer between the first substrate and the second substrate.

In some embodiments, steps 310-steps 340 may be performed in any order. For example, a plurality of openings 215 in the first substrate 210 may be formed simultaneously, before, or after forming a plurality of openings 225 in the second substrate 220. Laminating the polymer interlayer between the first and second substrates may be performed before or after forming the plurality of openings in the first substrate or the second substrate.

In some embodiments, the plurality of openings in the first and second substrates 210 and 220 are formed simultaneously, before, or after forming the plurality of openings 235 in the polymer interlayer 230.

Process Order Variations

Laminating Before Forming Openings

Figure 4:
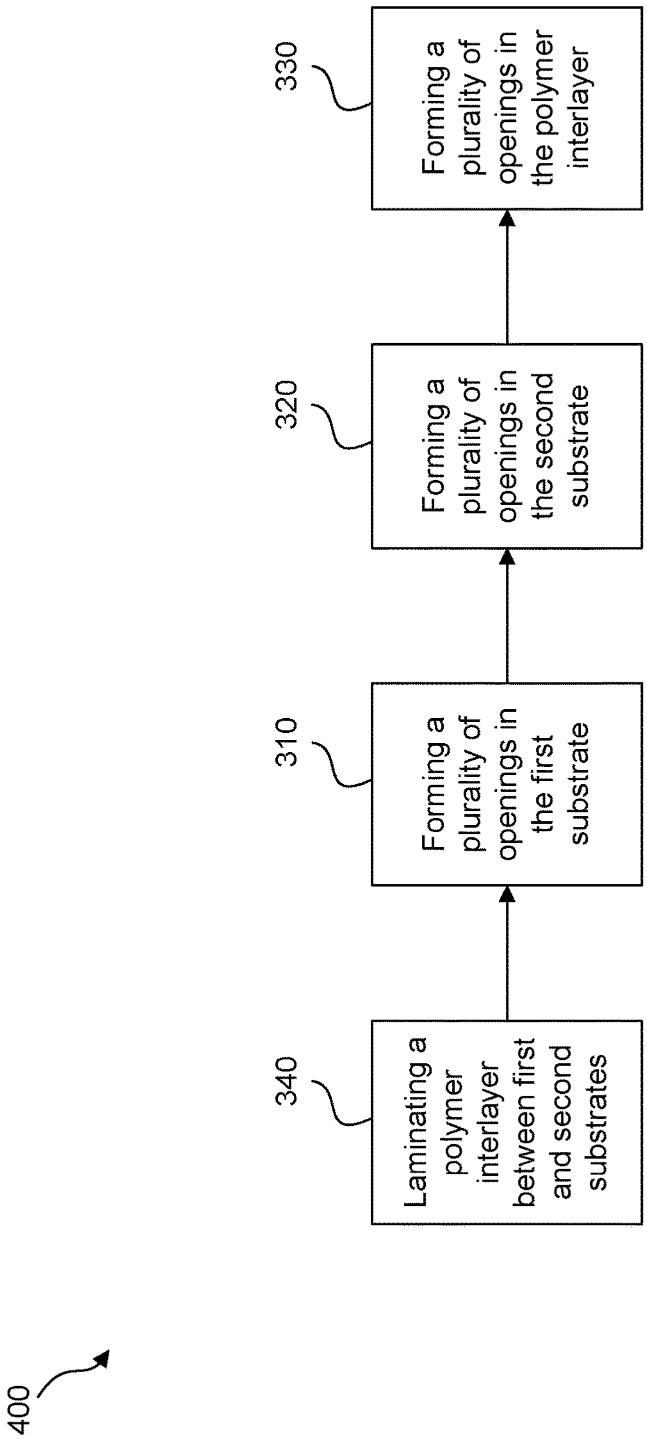
FIG. 4 shows an exemplary process flowchart for forming a micro-perforated glass or glass-ceramics laminate according to an embodiment.

In some embodiments, as shown in the process flowchart in FIG. 4, laminating the polymer interlayer 230 between the first substrate 210 and the second substrate 220 is performed before forming the plurality of openings 215 in the first substrate 210, plurality of openings 225 in the second substrate 220, and the plurality of openings 235 in the polymer interlayer 235.

Laminating after Forming Openings

In some embodiments, forming the plurality of openings 235 in the polymer interlayer 230 is performed after laminating the polymer interlayer between the first and second substrates. Where a laser is used to form the opening or create damage tracks, this order of steps may require the use of a laser beam or laser energy different from that used to form openings or damage tracks before lamination, such that the laser beam reaches and is absorbed by each of the first and second substrates and the polymer layer where the laser is used with sufficient intensity to achieve the desired damage.

Figure 5:
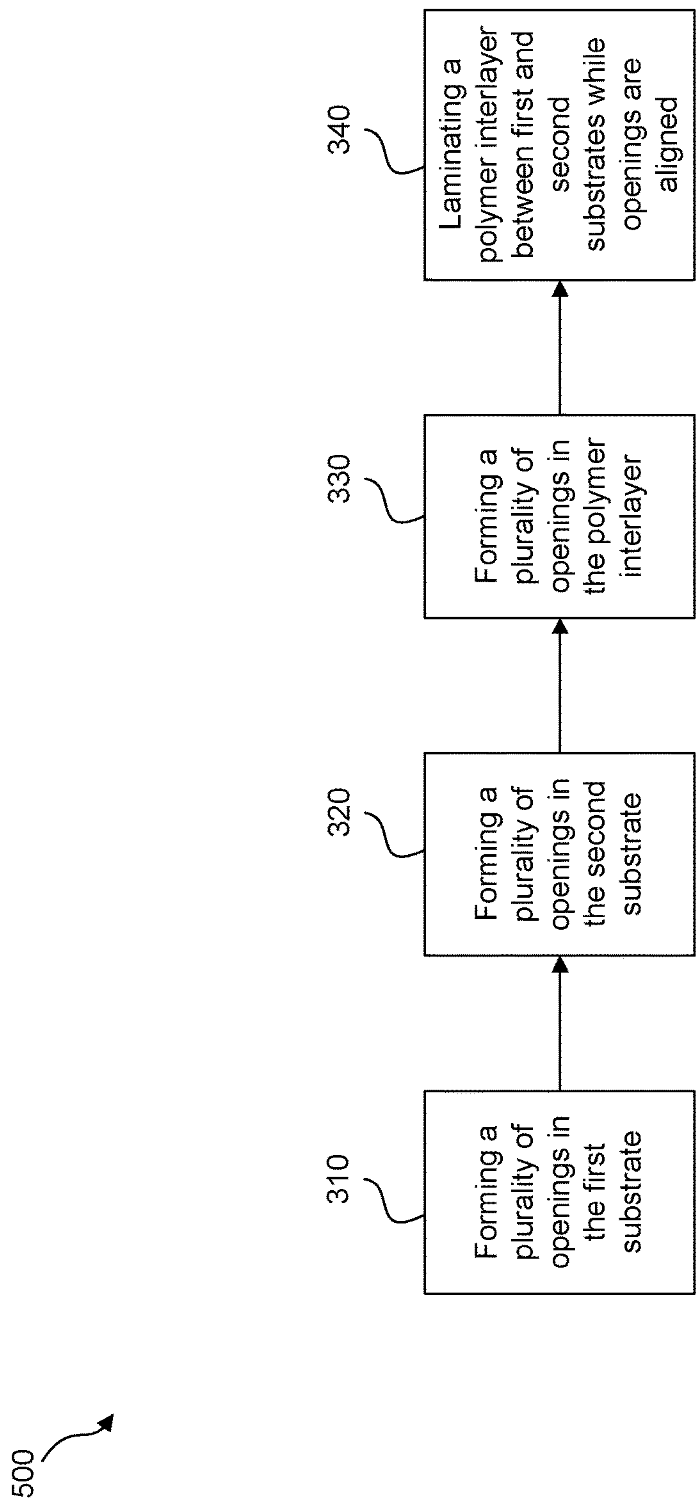
FIG. 5 shows an exemplary process flowchart for forming a micro-perforated glass or glass-ceramics laminate according to an embodiment.

In some embodiments, as shown in the process flowchart in FIG. 5, laminating the polymer interlayer 230 between the first substrate 210 and the second substrate 220 is performed after forming the plurality of openings 215 in the first substrate 210, plurality of openings 225 in the second substrate 220, and the plurality of openings 235 in the polymer interlayer 235. The plurality of openings in the first substrate 210, polymer interlayer 230 and the second substrate 220 must be aligned during laminating the polymer interlayer between the first substrate 210 and the second substrate 220 such that the openings are aligned even after lamination.

Laminating Before Forming Openings and Etching

Figure 6:
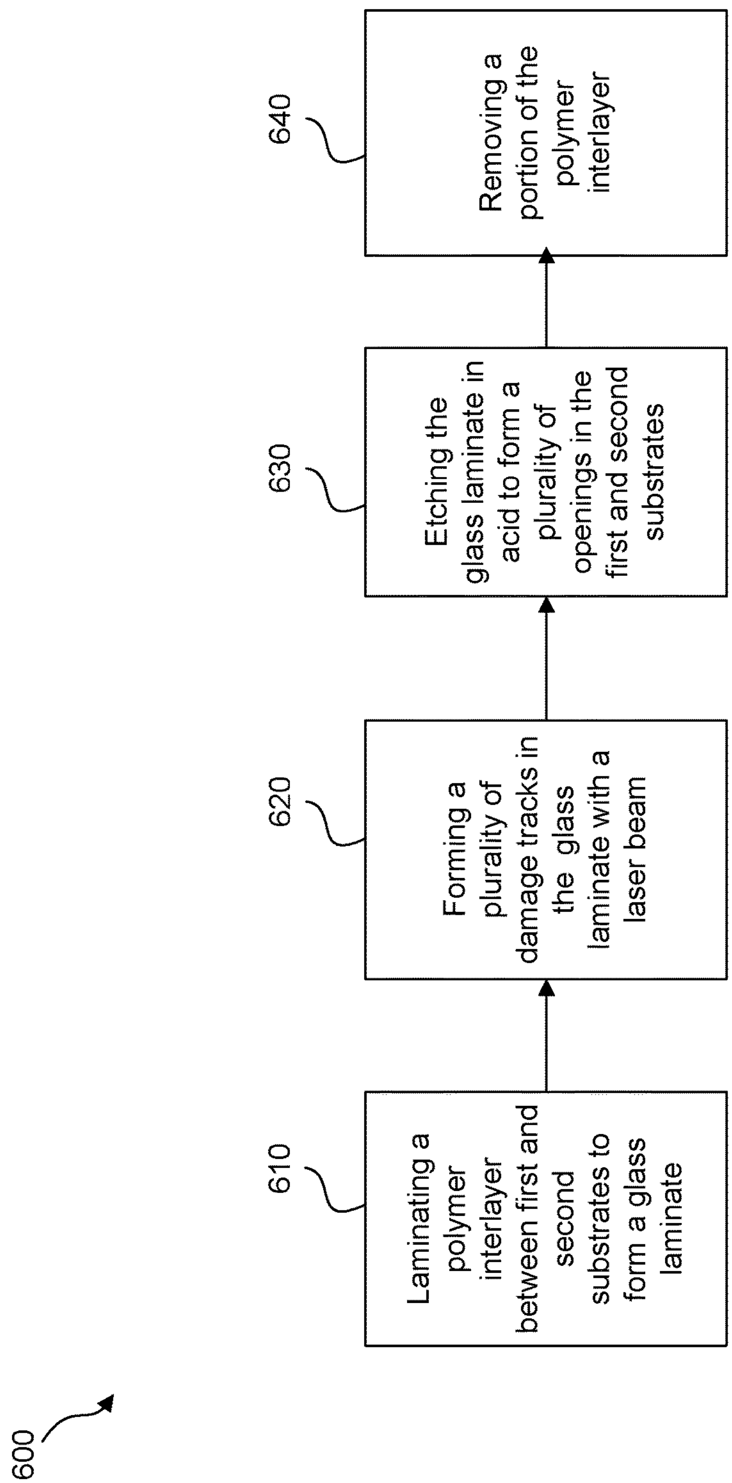
FIG. 6 shows an exemplary process flowchart for forming a micro-perforated glass or glass-ceramics laminate according to an embodiment.

In some embodiments, as shown in the process flowchart in FIG. 6, a micro-perforated glass or glass-ceramics laminate may be formed by performing the following steps in order:

Step 610: laminating a polymer interlayer between the first substrate and the second substrate to form the glass or glass-ceramics laminate;

Step 620: forming a plurality of damage tracks in the glass or glass-ceramics laminate with a laser beam;

Step 630: etching the glass or glass-ceramics laminate in acid to form a plurality of openings in the first and second substrates;

Step 640: removing a portion of the polymer interlayer.

In some embodiments, the method of forming a micro-perforated glass or glass-ceramics laminate comprises laminating the polymer interlayer 230 between the first substrate 210 and the second substrate 220 to form the glass or glass-ceramics laminate, forming the plurality of damage tracks 1210 in the first substrate and the second substrate with the laser beam 1010. After forming the plurality of damage tracks 1210, etching the first and second substrates in an acid solution to form the plurality of openings 215 in the first substrate 210 and the second substrate 220 from the plurality of damage tracks 1210. After forming the glass or glass-ceramics laminate and after forming the plurality of openings in the first and second substrates, removing a portion of the polymer interlayer 230 to form the micro-perforated glass or glass-ceramics laminate 110.

In some embodiments, the plurality of openings 215 in the first substrate 210, plurality of openings 225 in the second substrate 220, and the plurality of openings 235 in the polymer interlayer 235, are aligned to form a plurality of micro-perforations 120 through the thickness of the glass or glass-ceramics laminate.

In some embodiments, forming the plurality of openings in the first and second substrates comprises forming a plurality of damage tracks 1210 with a laser beam 1010 and etching the first and second substrates having the plurality of damage tracks in an acid solution.

Laminating after Forming Openings and Etching

In some embodiments, the method for forming a micro-perforated glass or glass-ceramics laminate further comprises forming the plurality of damage tracks in the first and second substrates with the first laser beam, forming the plurality of openings in the polymer interlayer with a second laser beam, etching the first and second substrates having the plurality of damage tracks in the acid solution to form the plurality of openings in the first and second substrates, and after etching, laminating the polymer interlayer between the first and second substrates while the plurality of openings in the first and second substrates and the plurality of openings in the polymer interlayer are aligned.

In some embodiments, forming the plurality of openings in the polymer interlayer is performed by a process selected from the group consisting of solvent etching, laser drilling, thermal discharge, physical puncturing, mechanical drilling, and combinations thereof. Other suitable methods may be used. Where the laminate is formed and openings are formed in the first and/or second substrates before openings are formed in the polymer interlayer, the openings in the first and/or second substrate may be used as a guide or mask when forming openings in the polymer interlayer.

Figure 7:
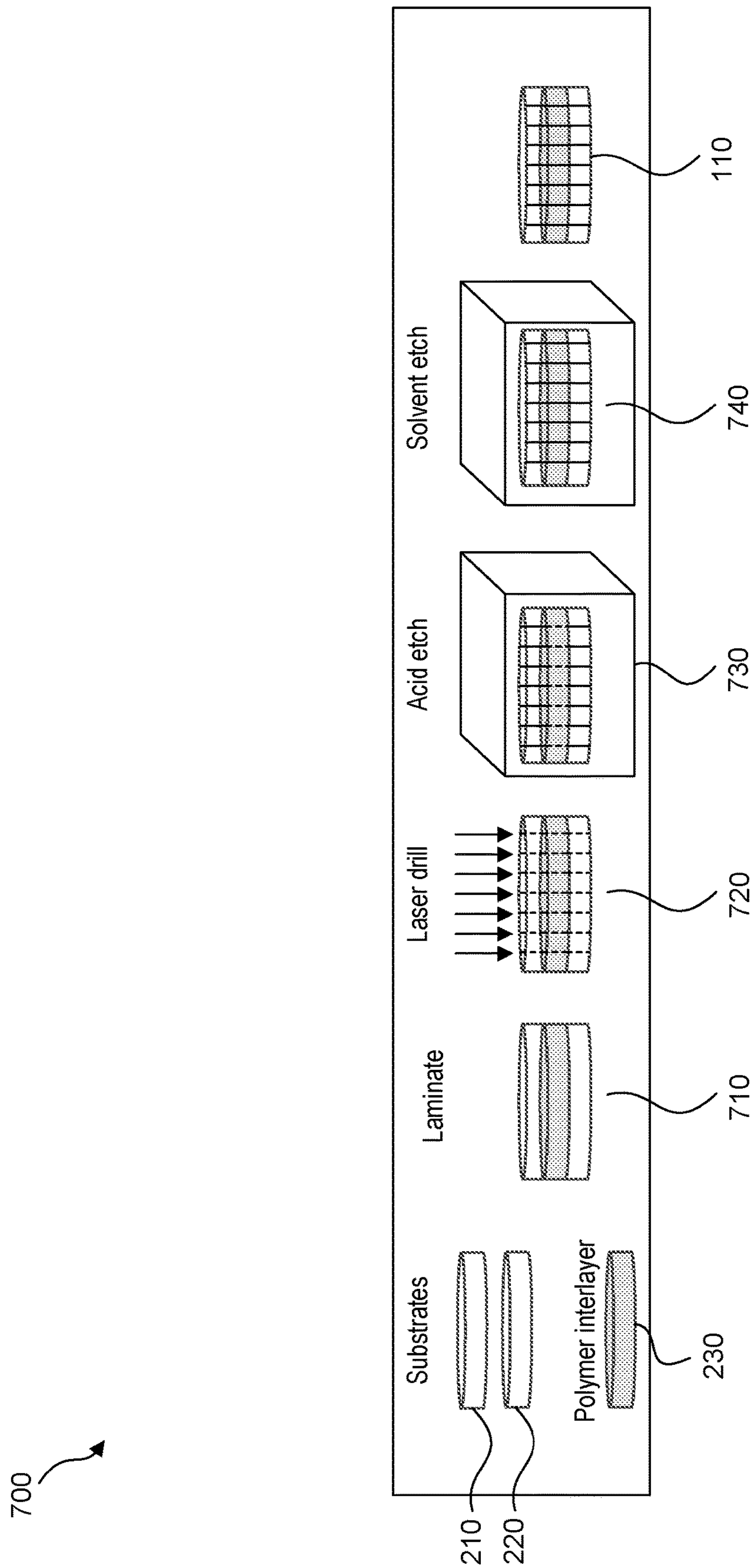
FIG. 7 shows exemplary process steps for forming a micro-perforated glass or glass-ceramics laminate according to an embodiment.
Figure 8:
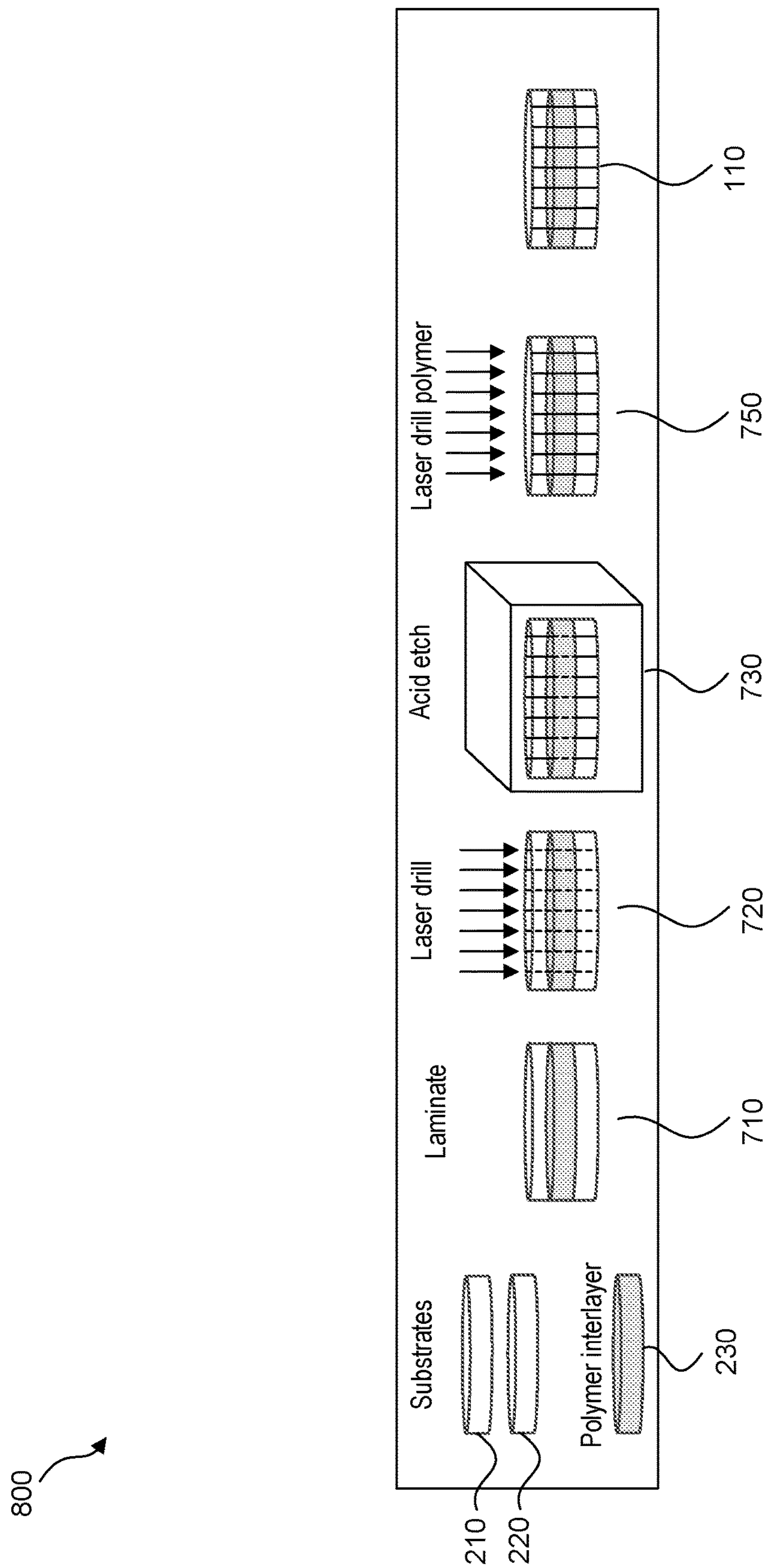
FIG. 8 shows exemplary process steps for forming a micro-perforated glass or glass-ceramics laminate according to an embodiment.
Figure 9:
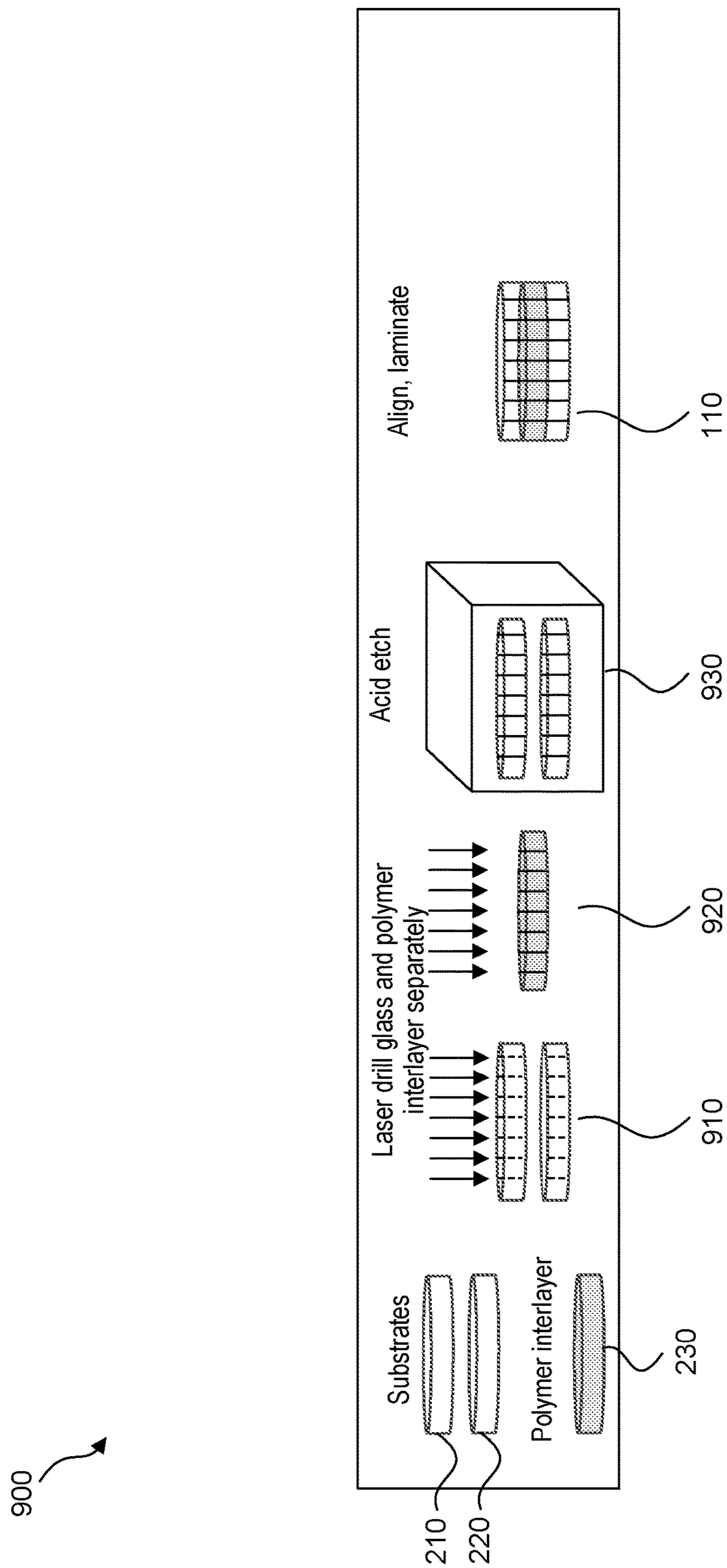
FIG. 9 shows exemplary process steps for forming a micro-perforated glass or glass-ceramics laminate according to an embodiment.

FIGS. 7-9 illustrate exemplary process steps for forming a micro-perforated glass or glass-ceramics laminate 110 and process variants. Other process order variations and methodology may also be used.

Laminating Before Etching and Laser Drilling

FIG. 7 illustrates process steps for forming a micro-perforated glass or glass-ceramics laminate. The process includes the following steps, in order:

Step 710: laminating the polymer interlayer between the first and second substrates to form a glass or glass-ceramics laminate;

Step 720: forming a plurality of damage tracks in the glass or glass-ceramics laminate with a laser beam;

Step 730: etching the glass or glass-ceramics laminate in an acid solution to form a plurality of openings in the first and second substrates;

Step 740: removing a portion of the polymer interlayer by solvent etching.

FIG. 8 illustrates process steps for forming a micro-perforated glass or glass-ceramics laminate. The process includes the following steps, in order:

Step 710: laminating the polymer interlayer 230 between the first and second substrates (210 and 220) to form a glass or glass-ceramics laminate;

Step 720: forming a plurality of damage tracks in the glass or glass-ceramics laminate with a laser beam;

Step 730: etching the glass or glass-ceramics laminate in an acid solution to form a plurality of openings in the first and second substrates;

Step 750: removing a portion of the polymer interlayer by laser drilling.

In some embodiments, removing a portion of the polymer interlayer may be performed by laser drilling, as illustrated in step 750 of FIG. 8.

In some embodiments, the first laser beam configured to form a plurality of damage tracks 1210 in the first and second substrates may be different than the second laser beam configured to form openings 235 in the polymer interlayer 230. In some embodiments, the first and the second laser beam are the same. In some embodiments, the laser energy, focus line, laser exposure time, and combinations thereof may be the same or different for forming the plurality of openings in the first and second substrates and the polymer interlayer.

Laminating after Etching and Laser Drilling

FIG. 9 illustrates process steps for forming a micro-perforated glass or glass-ceramics laminate. The process includes the following steps, in order:

Step 910: forming a plurality of damage tracks in the first and second substrates (210 and 220) with a laser beam;

Step 920: forming a plurality of openings in the polymer interlayer 230 by a laser beam;

Step 930: etching the first and second substrates in an acid solution to form a plurality of openings in the first and second substrates from the damage tracks formed in step 910;

Step 940: laminating the polymer interlayer 230 with a plurality of openings 235 between the first substrate 210 with a plurality of openings 215 and the second substrate 220 with a plurality of openings 225 while aligned to form a micro-perforated glass or glass-ceramics laminate 110.

In some embodiments, the openings in the substrates and the polymer interlayer may be desirably aligned to obtain better sound absorption and a higher Noise Reduction Coefficient.

Various process orders are described above in description of FIGS. 3-9. Any suitable process order may be used. Exemplary details of each process are described below. Any suitable combination of process details and process order may be used to form the micro-perforated glass or glass ceramic laminate.

Process Details

Laminating the Polymer Interlayer

In some embodiments, laminating the polymer interlayer may be performed by any suitable method for laminating glass and polymers including, but not limited to, use of rollers, vacuum bags, autoclaves etc. and combinations of time, temperature, pressure, and combinations thereof. Other suitable methods may be used.

Laser Drilling the Substrates

In some embodiments, forming the plurality of openings in the first and second substrates is performed by a process selected from the group consisting of acid etching, laser drilling, laser drilling followed by acid etching, mechanical drilling, and combinations thereof. Other suitable methods may be used.

Figure 10:
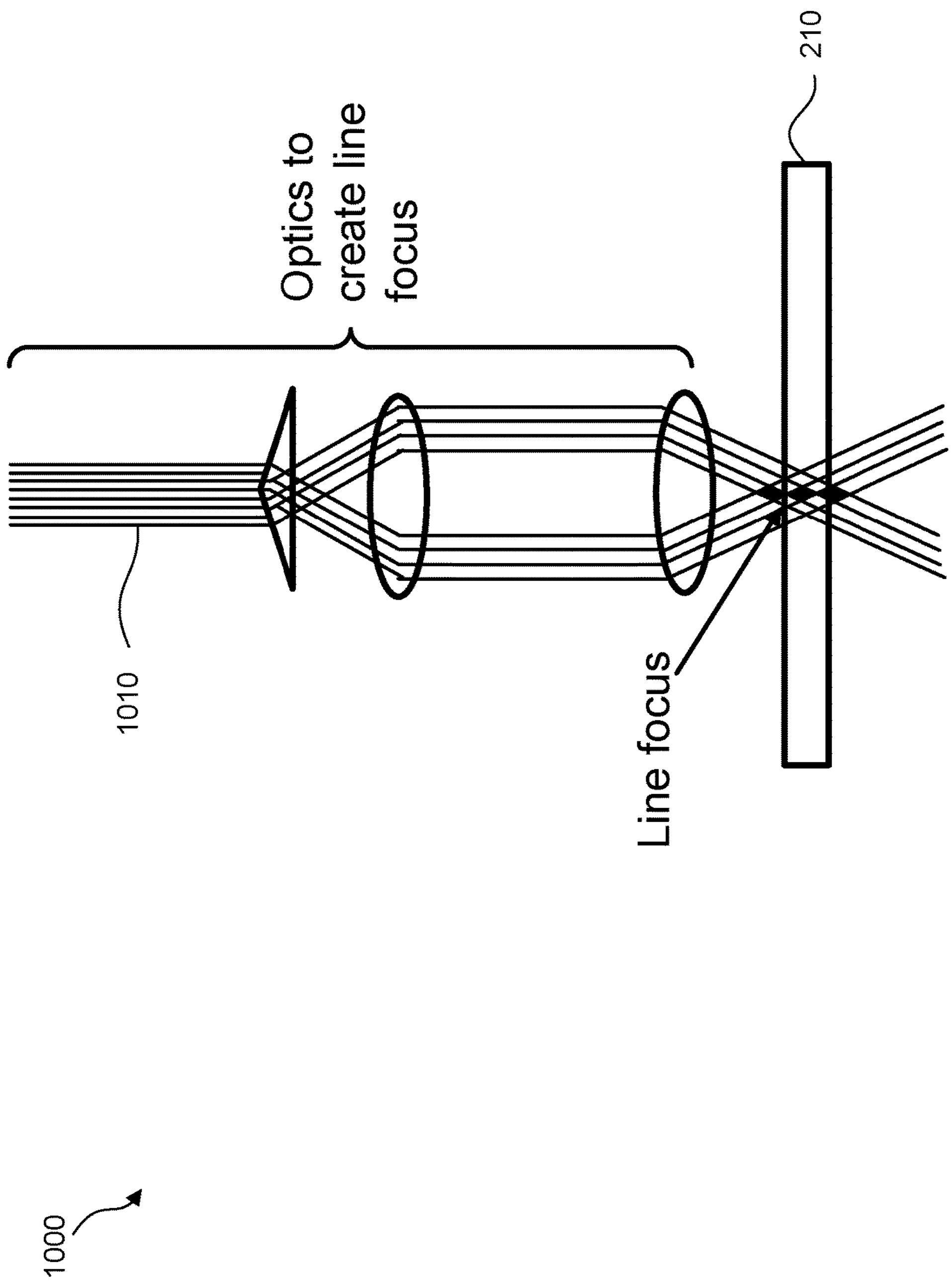
FIG. 10 shows a schematic view of a laser system according to an embodiment.

In some embodiments, a laser beam 1010 is a pulsed laser beam having a focal line oriented along a beam propagation direction and directing the laser beam focal line into a glass substrate, a polymer interlayer, or a glass or glass-ceramics laminate. FIG. 10 illustrates a schematic view 1000 of an exemplary laser system incident on a substrate 210.

In some embodiments, the laser beam may be a Gauss-Bessel laser beam followed by chemical etching. In some embodiments, the method may be configured as a large scale process, with high throughput. In some embodiments, the method may be used to manufacture micro-perforated glass or glass-ceramics laminates of large size, for example, 1'×1' or larger. The method is a high speed process for manufacturing high density array of micro-perforations, and affords flexibility to manufacture various micro-perforation shapes, sizes, micro-perforation locations and density to tune and achieve the desired acoustic performance. Further, the micro-perforated glass or glass-ceramics laminates may be thermally or chemically strengthened post etching to achieve superior strength, as described herein.

Figure 11:
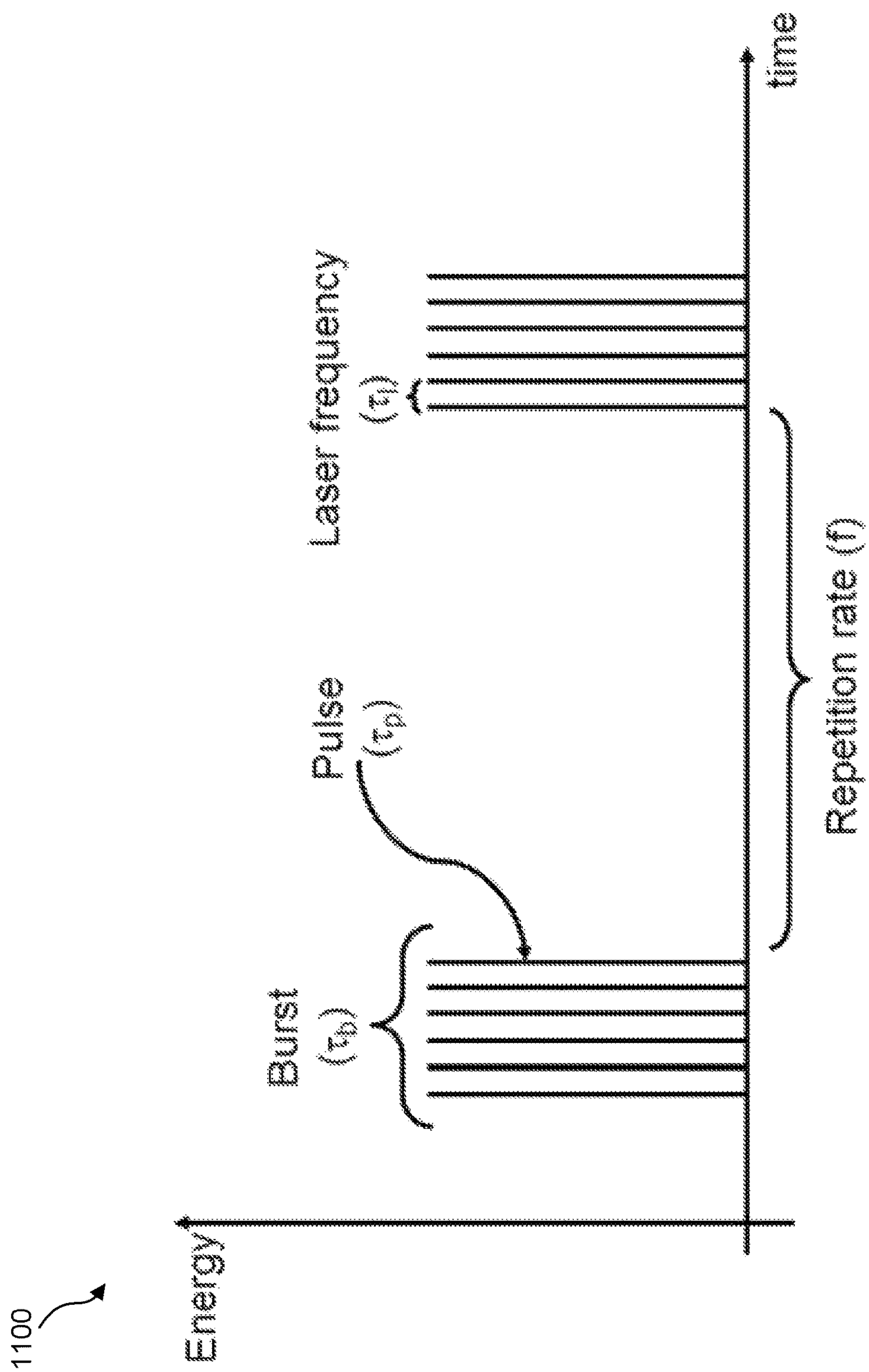
FIG. 11 shows a representative laser burst pattern according to an embodiment.

FIG. 10 shows a representative schematic of a drilling method that uses a line focus of a laser beam to create damage tracks 1210 (e.g., defects or openings in a glass substrate) or micro-perforations 120 in a glass or glass-ceramics laminate according to an environment. As shown in FIG. 11, the laser burst pattern (emission vs. time) may be tailored based on a specific need. A representative pattern of a laser system (e.g., a picosecond laser) may be characterized by a burst which may contain one or more pulses. The frequency of the bursts defines the repetition rate of the laser, for example about 100 kHz (10 μsec). The time between sub-pulses may be much shorter, for example about 20 nsec. If the ratio of thickness of the glass or glass-ceramics laminate to the largest dimension of the micro-perforation is to be very low, a cutting operation may be used instead of a laser drilling operation.

In some embodiments, the method includes using a non-diffracting laser beam, for example, a Gauss-Bessel beam. These types of beams can propagate for a considerable distance before diffraction effects have a strong impact on the beam divergence and therefore, when focused, the axial intensity decays much slower compared to Gaussian beams. To create a Gauss-Bessel beam, an axicon can be combined with a collimating lens and a focusing lens. The exact characteristic of the optical elements (axicon vertex angle, lens focal distance, separation between optical elements, etc.) contribute to the characteristics of the line focus.

In some embodiments, a Nd:YAG laser operating at about 1064 nm and about 532 nm may be used. In some embodiments, a laser wavelength between about the near infrared and about the UV range of the spectrum may be used. The laser may produce a series of bursts separated by about 10 us or more (repetition rate). Each burst may contain a number of pulses selected by the user in the range of between about 2 and about 20 pulses. In some embodiments, single pulse bursts may be used. Each pulse may have a duration of about 10 ps. In some embodiments, the time between adjacent pulses may be about 20 ns (laser frequency). The laser frequency may be determined by the fundamental frequency of the oscillator in the laser design.

In some embodiments, advantageously, the pulse separation may be set to be about <100 ns in order to optimize the burst effects.

In some embodiments, the transverse and axial energy distributions of a Gauss-Bessel beam may be controlled. In some embodiments, the laser diameter (e.g., full width of the beam at half its maximum intensity) of the central lobe of the transverse distribution is about 1 μm and about 1.35 mm for the axial distribution.

In some embodiments, an energy range that results in a damage track 1210 is between about 50 μJ and about 200 μJ per burst. In some embodiments, the energy range that results in a damage track 1210 may be varied depending on, for example, the optical configuration, burst number, glass composition, etc. The exact timing, pulse durations, and repetition rates can vary depending on the laser design. Advantageously, relatively short pulses (e.g., about <15 psec) of high intensity may be used.

In some embodiments, optimum optical elements and laser conditions are used to create a region of high laser intensity (line focus) longer than the glass or glass-ceramics laminate thickness. When the intensity is high enough, the laser interaction with the glass or glass-ceramics laminate falls in the nonlinear regime and includes two photon absorption, Kerr effect, and cascade ionization, among others. Damage tracks 1210 created by laser serve as a preferential path for the wet etching process. The damage tracks can be up to about 2 mm in depth by using a single burst per opening. These damage tracks may generally take the form of openings with interior dimensions of between about 0.5 μm and about 1.5 μm.

In some embodiments, an array of openings 215, 225 (that will eventually become finished micro-perforations) may be formed as described above. In some embodiments, target locations of the micro-perforations on the glass or glass-ceramics laminate are uploaded to the laser processing machine as a set of coordinates. In some embodiments, the machine raster scans the glass or glass-ceramics laminate and synchronizes the laser trigger such that the laser fires whenever a damage track 1210 or an opening 215, 225 is desired. In some embodiments, the stages move at about 1 m/s and the time per raster may be independent of micro-perforation density.

Laser Drilling the Polymer Interlayer

In some embodiments, removing a portion of the polymer interlayer may comprise forming a plurality of openings in the polymer interlayer by a laser beam, followed by solvent etching. In some embodiments, removing a portion of the polymer interlayer may comprise forming plurality of openings in the polymer interlayer by solvent etching, followed by a laser drilling method. In some embodiments, the plurality of openings in the polymer interlayer may be formed by laser drilling or ablation of the polymer interlayer.

In some embodiments, the laser configured to remove portions of the polymer interlayer may be a $CO_2$ laser. Other suitable lasers and laser energies may be used. The diameter of the openings may be adjusted by changing the laser parameters such as, but not limited to, laser energy, exposure time, frequency, etc.

Solvent Etching the Polymer Interlayer

In some embodiments, removing a portion of the polymer interlayer may be performed by etching the polymer interlayer in a solvent. The polymer etching solvent may be selected from a group consisting of methanol, toluene, butyl glycol, butyl diglycol, and combinations thereof. For example, 40-60% methanol with the balance toluene may be used for dissolving the polymer interlayer. Other suitable solvents may be used.

In some embodiments, a portion of the polymer interlayer may be removed using any suitable solvent or solvent blend, including the use of any suitable solvent temperature, agitation, sonication, and exposure time. Other suitable methods may be used.

In some embodiments, unless protected, portions of the polymer interlayer around the edges of the glass or glass-ceramics laminate may be exposed to solvents during removal of a portion of the polymer interlayer by solvent etching. Edges of the glass or glass-ceramics laminate wherein the polymer interlayer is exposed to the solvent may be sealed with a sealant, resistant to the solvent or solvent mixture used for removing a portion of the polymer interlayer. For example, a Dow Corning RTV sealant may be used to prevent undesirable etching of the polymer interlayer from the edges of the glass or glass-ceramics laminate during solvent etching. In some embodiments the edges may be sealed by a tape, or temporarily sealed to a fixture by an o-ring or other compliant material.

Excess Solvent Removal

In some embodiments, removal of excess or residual solvent is desirable from a quality standpoint. Excess solvent may be removed under atmospheric gas pressure, humidity, pressure, temperature, and a combination thereof. For example, excess solvent may be removed following etching by placing the parts in a vacuum oven at 20-40° C. Other suitable methods may be used.

Acid Etching the Substrates

In some embodiments, the laser damaged glass or glass-ceramics laminate is then acid etched to open the damage tracks 1210 to the desired diameter and shape. The acid etching processing of the first and second substrates may be performed by using a hydrofluoric acid (HF) based solution, for example, to chemically attack and remove material from the preferential damage track 1210 created by the laser 1010. In some embodiments, while this reaction is occurring, byproducts such as alkali or aluminofluorates are generated depending on the glass composition. These byproducts are relatively insoluble in HF. In some embodiments, a secondary mineral acid is added, for example, nitric acid ($HNO_3$). The addition of the nitric acid increases the solubility of these etchant byproducts as well as the overall etch rate to prevent clogging of the etch openings and lengthen bath life.

Figure 12:
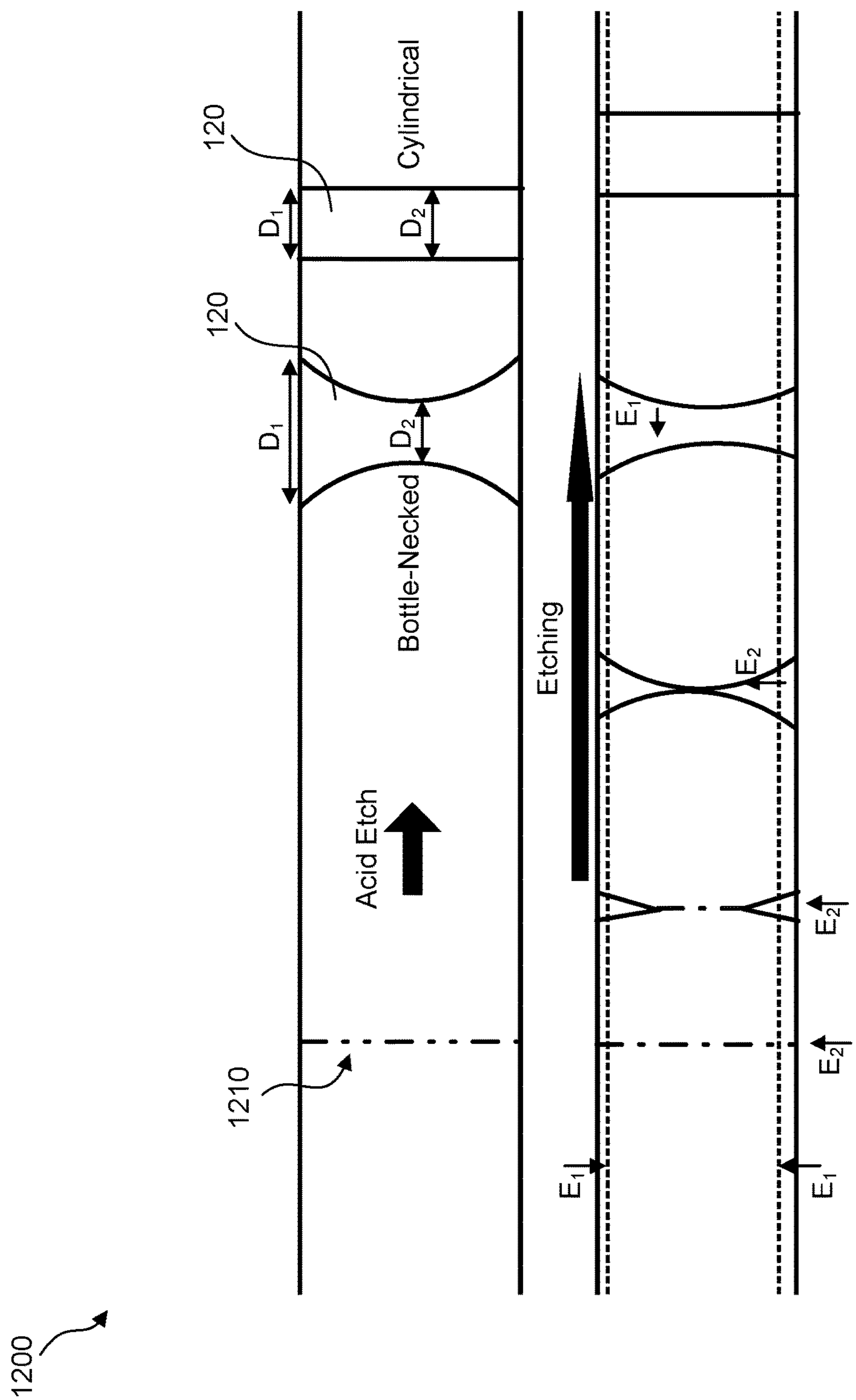
FIG. 12 shows a schematic illustration of a representative method of forming micro-perforations according to an embodiment.

In some embodiments, and as shown in FIG. 12, the shape of the etched micro-perforation may depend on the ratio of reaction rate to diffusion rate. The reaction rate directly effects the etch rate of the bulk glass (E1) on the surface while the diffusion rate drives the etch rate of the opening (E2). The reaction rate or effective etch rate is driven by kinetics and can be controlled by the etchant chemistry, glass composition, and temperature. For example, using a more concentrated HF solution, a glass of weaker bonding network, or an increased bath temperature can all increase the reaction rate of the system by introducing more available hydronium and fluorine ions and adding energy to allow them to react at a higher rate. The diffusion rate is the rate at which these active ions are introduced to the bulk or inside the glass part to react with new glass molecules. Diffusion may be affected by many factors such as agitation (e.g., ultrasonics and recirculation), wettability of the part, and temperature. By adjusting these parameters the shape of the micro-perforation may be tailored from an hourglass to a cylindrical opening in the first or second glass substrate 210, 220.

In some embodiments, the acid etchant used is about 1.5 M Hydrofluoric and about 1.6 M Nitric acid having an effective etch rate of about 1.0 μm/min. The glass substrates or glass or glass-ceramics laminates may be etched in a JST etching system equipped with a directly coupled, base ultrasonic transducer with an output frequency of about 40 kHz. In some embodiments, the glass substrates or glass or glass-ceramics laminates are vertically agitated at about 300 mm/s while the etchant is recirculated bottom to top within the bath. This agitation increases diffusion into the openings and helps to homogenize the ultrasonic waves that meet the glass surface. In some embodiments, the bath temperature is maintained at about 20.3 C° (within about +/−0.1 C°) by pumping cooler etchant from the bottom. Warmer etchant, which is heated by the ultrasonics, overflows and is routed back through a chiller. This configuration of etching process allows for the appropriate amount of diffusion of acid into the damage tracks so that the resulting micro-perforations are open and may be substantially cylindrical. To attain a more hourglass shape in the openings, the ultrasonics in the system may be turned off to decrease the diffusion into the openings which in turn decreases the etch rate of the openings interior (E2). The shape of the openings can be tailored by adjusting the ratio of diffusion rate to reaction rate by tuning parameters such as concentration, temperature, agitation, etc.

After etching, in some embodiments, the glass or glass-ceramic may be tempered, or chemically treated (e.g., an ion-exchanging operation) to strengthen the micro-perforated glass or glass-ceramic layers prior to lamination with the polymer interlayer forming laminate 110.

Figure 13:
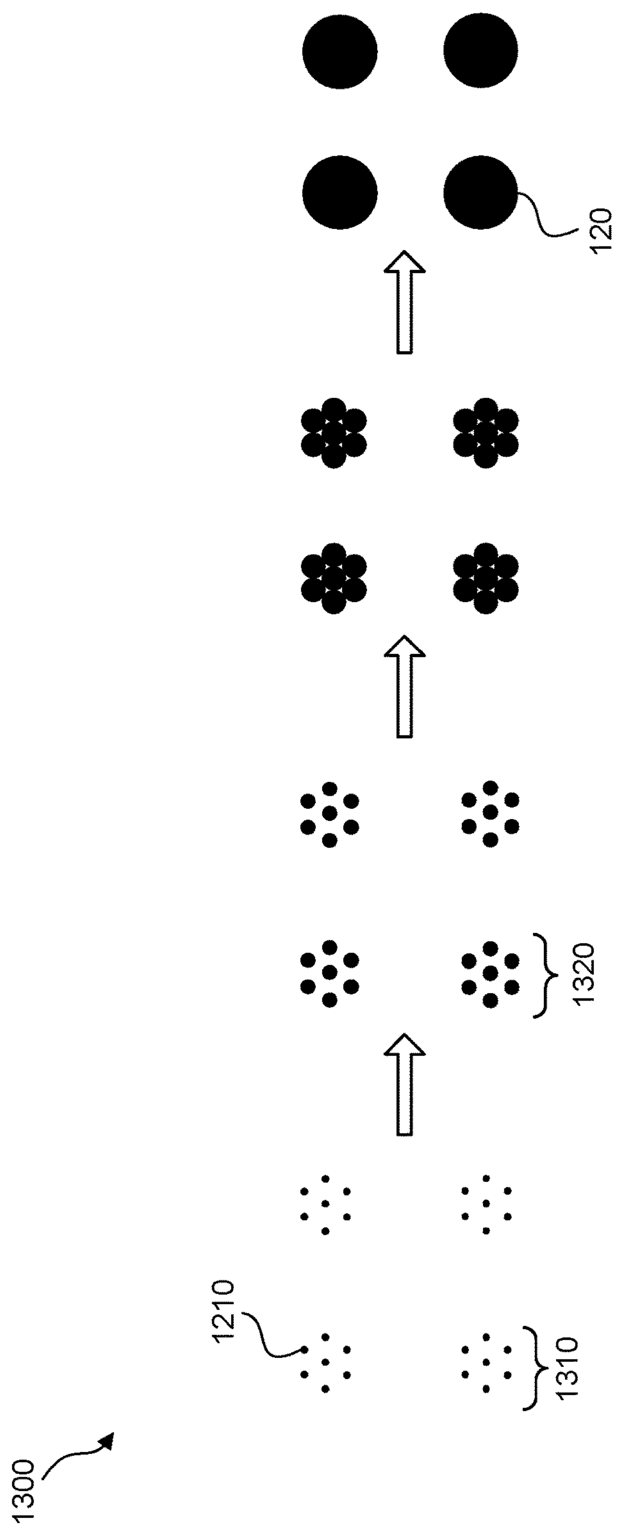
FIG. 13 shows a schematic illustration of a representative method of forming micro-perforations according to an embodiment.

The present disclosure also provides a method of forming micro-perforations in a glass or glass-ceramic laminate, similar to those described above. As shown in FIG. 13, for example, the method includes forming a plurality of damage tracks 1210 into the glass or glass-ceramic substrate or glass or glass-ceramics laminate by a laser beam, wherein damage tracks 1210 are positioned to form a cluster 1310. In some embodiments, the laser damages the material using several laser pulses. In some embodiments, the laser process creates groups of damage tracks in close proximity, which then merge together forming larger openings 1320 during an etching process to eventually create the glass substrate with openings 215, 225 or the micro-perforated glass or glass-ceramics laminate 110 with micro-perforations 120.

In some embodiments, the plurality of damage tracks 1210 are grouped into a plurality of clusters 1310, each cluster 1310 including more than one damage track 1210, wherein the damage tracks within each cluster merge into a single micro-perforation during etching the first and second substrates 210 and 220, respectively, and each cluster 1310 forms a discrete micro-perforation.

In some embodiments, as shown in FIG. 13, the layout of the damage tracks 1210 may be used to create any arbitrary shape by pre-positioning the laser damage track locations such that when merged they may form a desired shape. For example, a circle, a triangle, a square, and other polygons, non-linear shapes, text or numerals, logos, decorative patterns such as flowers, etc.

In some embodiments, the method includes forming a plurality of damage tracks 1210 into the glass or glass ceramic substrate 210, 220 by a laser beam, and each of the plurality of damage tracks forms a discrete micro-perforation 120 during etching the first and second substrates.

In some embodiments a single laser may be used to create the damage tracks. In some embodiments, multiple lasers may be used to create the damage tracks.

As shown in FIG. 13, individual damage tracks 1210 may be configured such that they merge as they form openings as the glass material etches, until the desired micro-perforation aperture shape is obtained (e.g., a circle in FIG. 13). In this regard, any arbitrary shape may be achieved based upon the positioning of the damage tracks 1210 and etching process.

Figure 14:
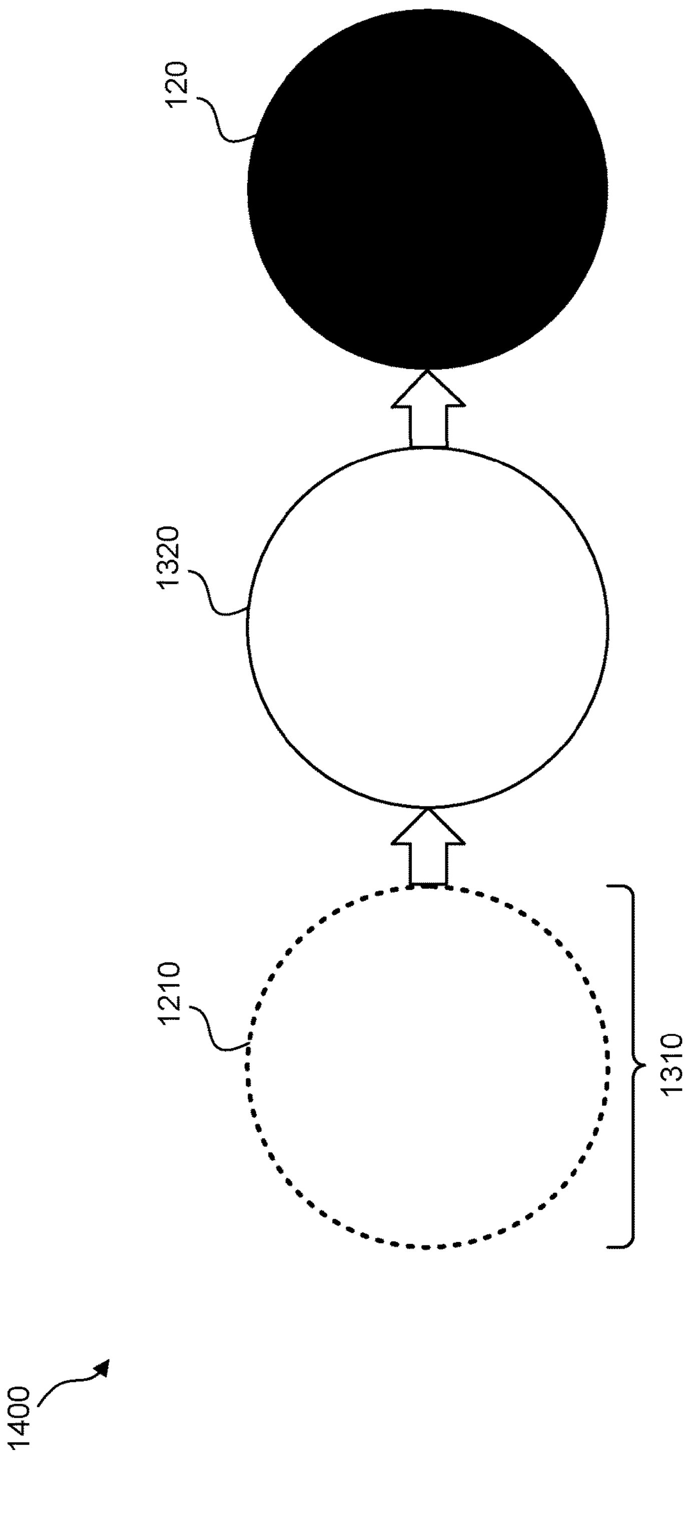
FIG. 14 shows a schematic illustration of a representative method of forming micro-perforations according to an embodiment.

With reference to FIG. 14, a similar method may be employed by forming a plurality of damage tracks 1210 into the glass or glass-ceramic substrate by a laser beam, wherein the damage tracks 1210 are positioned to form a peripheral pattern.

In some embodiments, the laser can be programmed to create single or multiple tiny adjacent damage tracks to form a plurality of damage tracks close to each other through control of the burst or pulse pattern or location. In some embodiments, the spacing between the adjacent damage tracks can be tailored to the desired perforation shape or perforation size on the glass or glass-ceramic substrate. For example, to create an elliptical micro-perforation shape, the laser can be programmed to create more adjacent damage tracks along a center line and less damage tracks above and below the center line. Upon etching in an acid solution this pattern will result in an elliptical shape as opposed to creating a circular micro-perforation shape with a single laser damage track.

In some embodiments, the laser can be programmed to strike the glass with multiple damage tracks on a particular section of the glass and also strike it to create less damage tracks on other sections. In some embodiments, the laser can be programmed to strike the glass substrate in the same location multiple times. Upon etching, this will result in a glass substrate or glass or glass-ceramics laminate with different micro-perforation sizes along the glass or glass-ceramics laminate, which allows for control of micro-perforation size or the largest dimension along the surface of the glass or glass-ceramics laminate.

Advantageously, in some embodiments, this particular method results in a high speed micro-perforation process. By using multiple laser pulses or bursts to create a plurality of damage tracks adjacent to one another, and followed by a chemical etching process to connect the damage tracks to form a larger perforation or opening, this process increases speed for creating such perforations/openings. In turn, the micro-perforations or openings may be applied in use for acoustic applications or other applications, for example, for decorative purposes.

Compared to a process in which a single laser pulse or burst is used to create a single preferential damage track for each micro-perforation, followed by the chemical etching to enlarge the perforations to the desired size or shape, a process utilizing multiple laser pulses or bursts to create adjacent damage tracks that merge into a single micro-perforation reduces the chemical etching time significantly, resulting in a process that is at least about 1.5 times greater than the speed of a single laser pulse method. Advantageously, the method employing multiple damage tracks per micro-perforation enhances the ease of manufacturing high aspect ratio micro-perforations in thick glass, achieving lower glass thickness reduction. In turn, these advantages reduce cost of manufacturing (in part to reduced etching time), and allow for high density micro-perforations to be formed relatively quickly, increasing manufacturing throughput of micro-perforated glass panels. The current cost driver for this process is the etching process, and utilizing a process that decreases etching time, hazardous waste, safety hazards, etc., is advantageous. Further, this process utilizing multiple damage tracks per micro-perforation results in decreased thickness reduction of the glass or glass-ceramics laminates during etching and therefore improves surface quality through reduced roughness, waviness, or surface imperfections from the etching process. Additionally, the process results in reduced distortions and increased optical quality.

Further, utilizing several damage tracks per micro-perforation is particularly advantageous when micro-perforations of high aspect ratio need to be created (e.g., in perforated sound absorption glass using relatively thick glass, such as in architectural or automotive applications), because etching time is reduced significantly. Additionally, utilizing several damage tracks per micro-perforation is particularly advantageous when it is necessary to create micro-perforations/openings of varying sizes and shapes on a single substrate. For example, micro-perforations may be formed in various shapes, as previously described. Different sizes, shapes, densities of perforations may be formed on a single substrate using a single process utilizing different numbers of laser-created damage tracks in various patterns, without the need for several separate drilling and etching steps. The cross-section of the perforations may also be controlled, for example, providing control over whether a cross section is generally circularly cylindrical or an "hour glass" shape.

Finally, for the methods utilizing multiple damage tracks per micro-perforation, acceptable process tolerances may be greater for both the laser drilling and etching, reducing risk and improving yield, especially for large substrate sizes. This is due to the resulting multiple laser drilled openings rendering the etching process relatively less critical, in addition to the laser drilling process being rendered relatively less critical because individual opening quality will have less impact when several laser drilled micro-perforations are merged into one micro-perforation after etching.

Figure 15A:
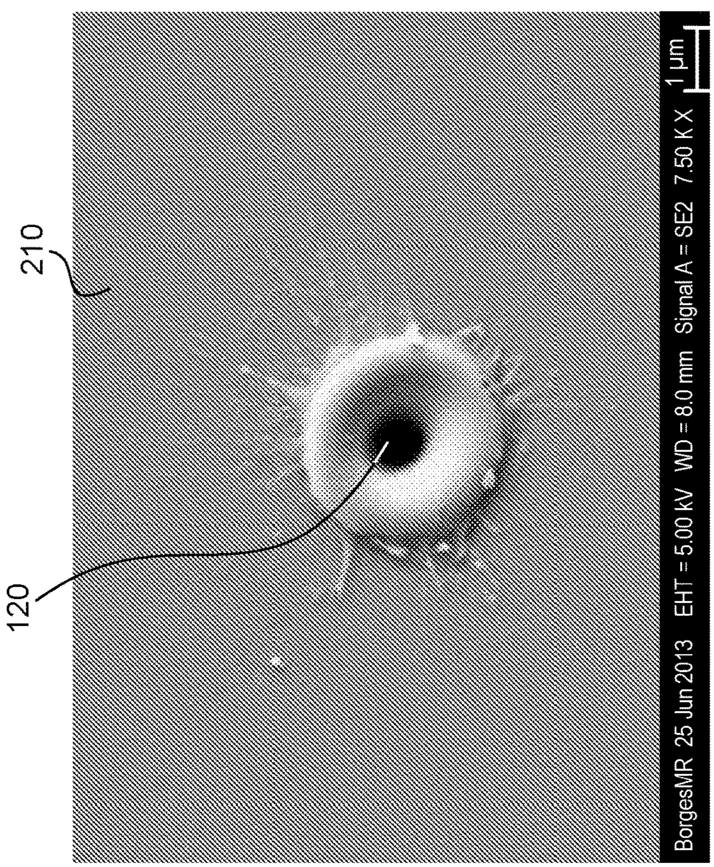
FIG. 15A shows a partial close up view of a micro-perforation according to an embodiment.
Figure 15B:
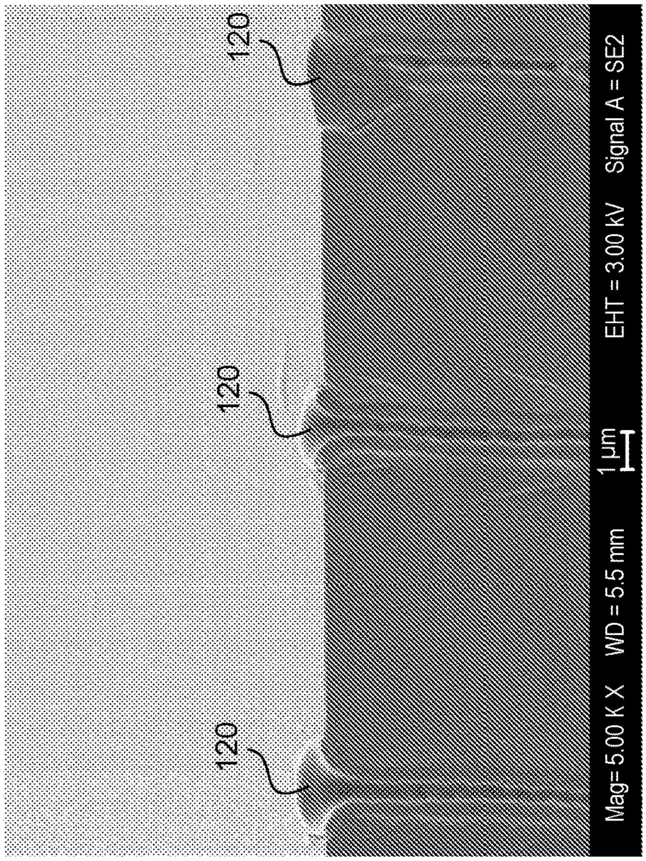
FIG. 15B shows a close-up cross sectional view of micro-perforations according to an embodiment.

FIGS. 15A and 15B show enlarged examples (electron micrograph images) of a top view 1500 of a micro-perforation 120 and cross-sectional view of multiple micro-perforations 120, for example. The cross-section of the micro-perforations may vary along a length of the micro-perforation through the thickness of the micro-perforated glass or glass-ceramics laminate 110. For example, an hourglass-shaped cross section (or "bottle neck" shaped), cylindrical, conical, or combinations thereof.

Figure 16:
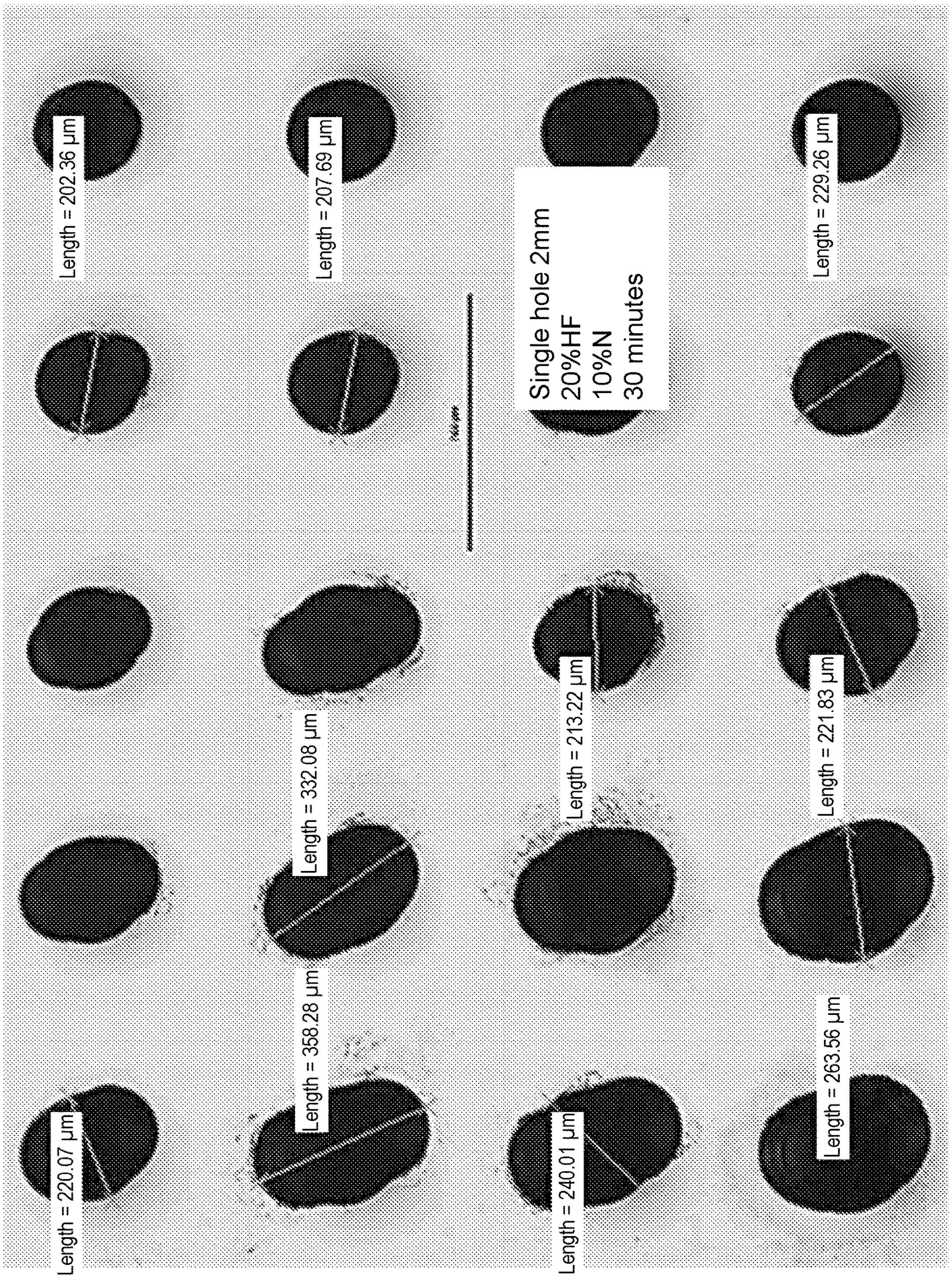
FIG. 16 shows a partial close up view of micro-perforations according to an embodiment.
Figure 17:
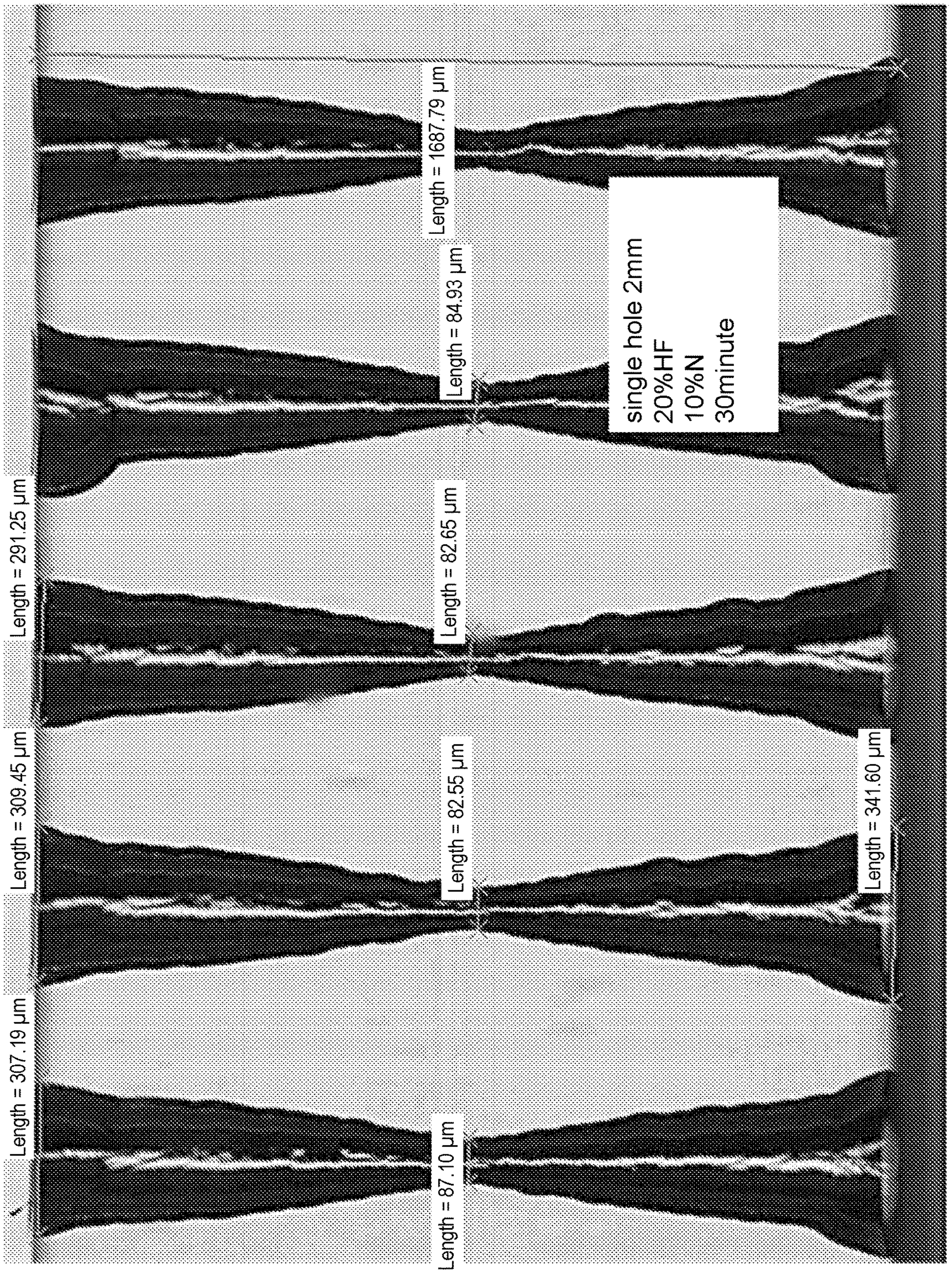
FIG. 17 shows a cross sectional view of micro-perforations according to an embodiment.

FIGS. 16 and 17 show examples of non-circular openings and non-circularly cylindrical micro-perforations. After forming damage tracks, the openings were formed by exposure for 30 minutes to an etchant having 20% hydrofluoric acid and 10% nitric acid.

In some embodiments, the removal of the polymer interlayer may be performed by laser drilling using a laser beam suitably adjusted to drill openings in polymer layers. Some of the advantages of laser drilling a polymer interlayer for a micro-perforated glass or glass-ceramics laminate are listed below.

i. Scaling up—Laser drilling can be employed as a large scale openings manufacturing process compared to solvent etching which is susceptible to variations in temperature and ultrasonics across a solvent tank affecting the etching uniformity.

ii. Cost effectiveness—Laser drilling can be a cost-effective process and provides flexibility to manufacture laminate systems with sizes up to and greater than 1'×1'.

iii. High throughput—A high density array of openings, with high accuracy and high rate can be formed resulting in high throughput while maintaining the high output quality.

iv. Design flexibility—The laser drilling process provides flexibility to manufacture arbitrary shapes, designs, sizes, etc. to tune and achieve the desired acoustic performance.

Figure 18:
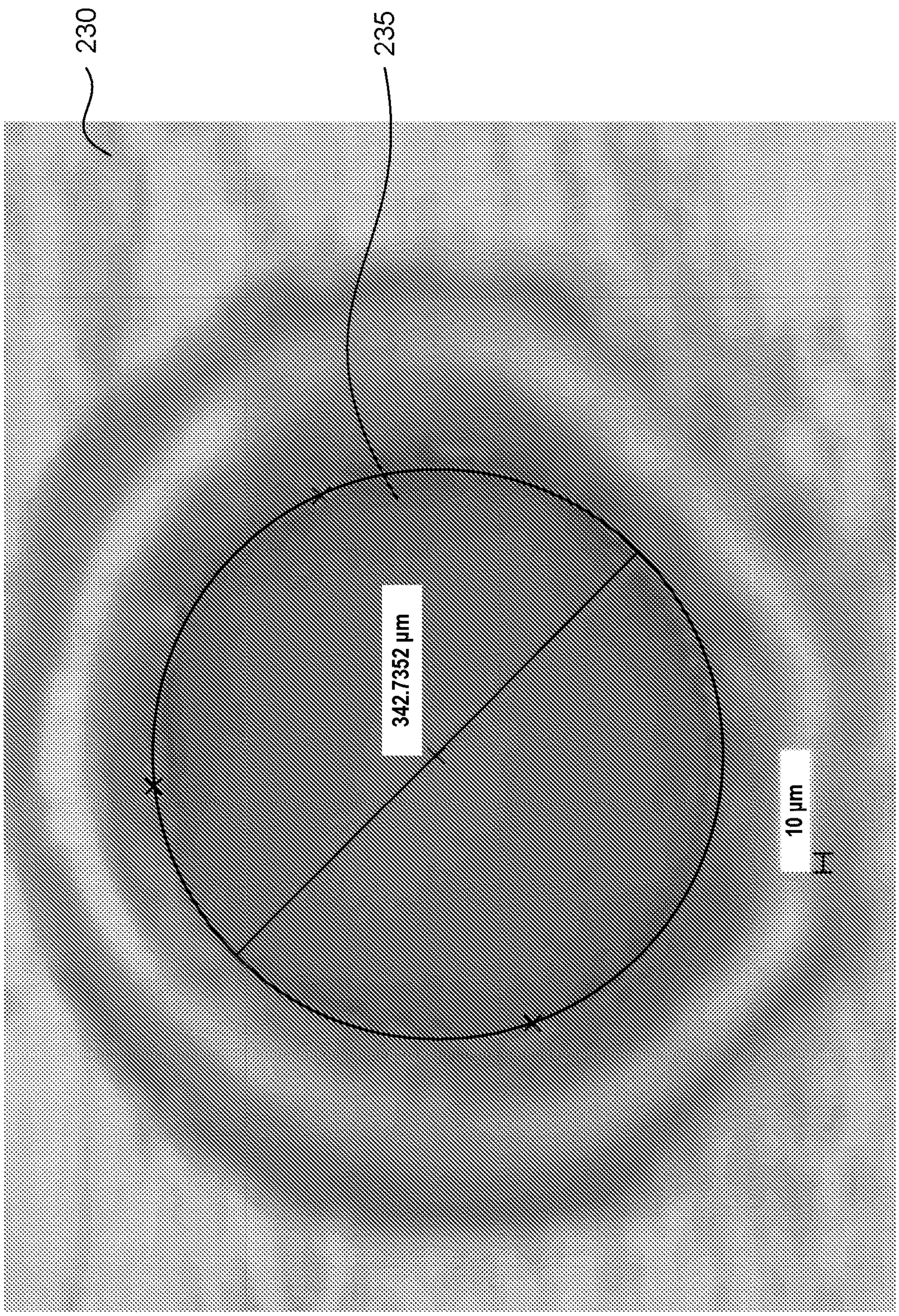
FIG. 18 shows a close-up view of a laser-drilled opening in the polymer interlayer according to an embodiment.

FIG. 18 shows a close-up view of a laser drilled opening 235 in the polymer interlayer 230. The laser may be a $CO_2$ laser. Other suitable lasers and laser energies may be used. The diameter of the openings may be adjusted by changing the laser parameters such as, but not limited to, laser energy, exposure time, frequency, etc.

In some embodiments, the diameter of a plurality of laser drilled openings in the polymer interlayer may be uniform or may be non-uniform. The diameter of the laser drilled openings in the polymer interlayer of the laminate may be 20 um, 50 um, 100 um, 150 um, 200 um, 250 um, 300 um, 350 um, 400 um, 500 um, 1000 um, or any range having any of these two values as endpoints. In some embodiments the diameter of laser drilled openings in the polymer interlayer may be different from the diameter of openings in the glass or glass ceramics layers to accommodate changes in the polymer opening diameter during lamination. For example, the diameter of the laser drilled opening in the polymer interlayer may be about 250 um, about 300 um, about 340 um.

The openings can be intentionally designed to have uniform opening size through the entire laminate or intentionally designed to be different in the glass or glass ceramic substrates and polymer interlayer or even different between different glass or glass ceramic substrates. For instance, the openings in the first glass or glass ceramic substrate can be the same as the opening in the polymer interlayer, but the opening in the second glass or glass ceramic substrate can have a different opening size. Similarly, the openings in two glass or glass ceramic substrates can be the same, but the polymer opening size can be different. Finally, each of the glass or glass ceramic substrates and the polymer interlayer can have the same opening size.

Figure 19:
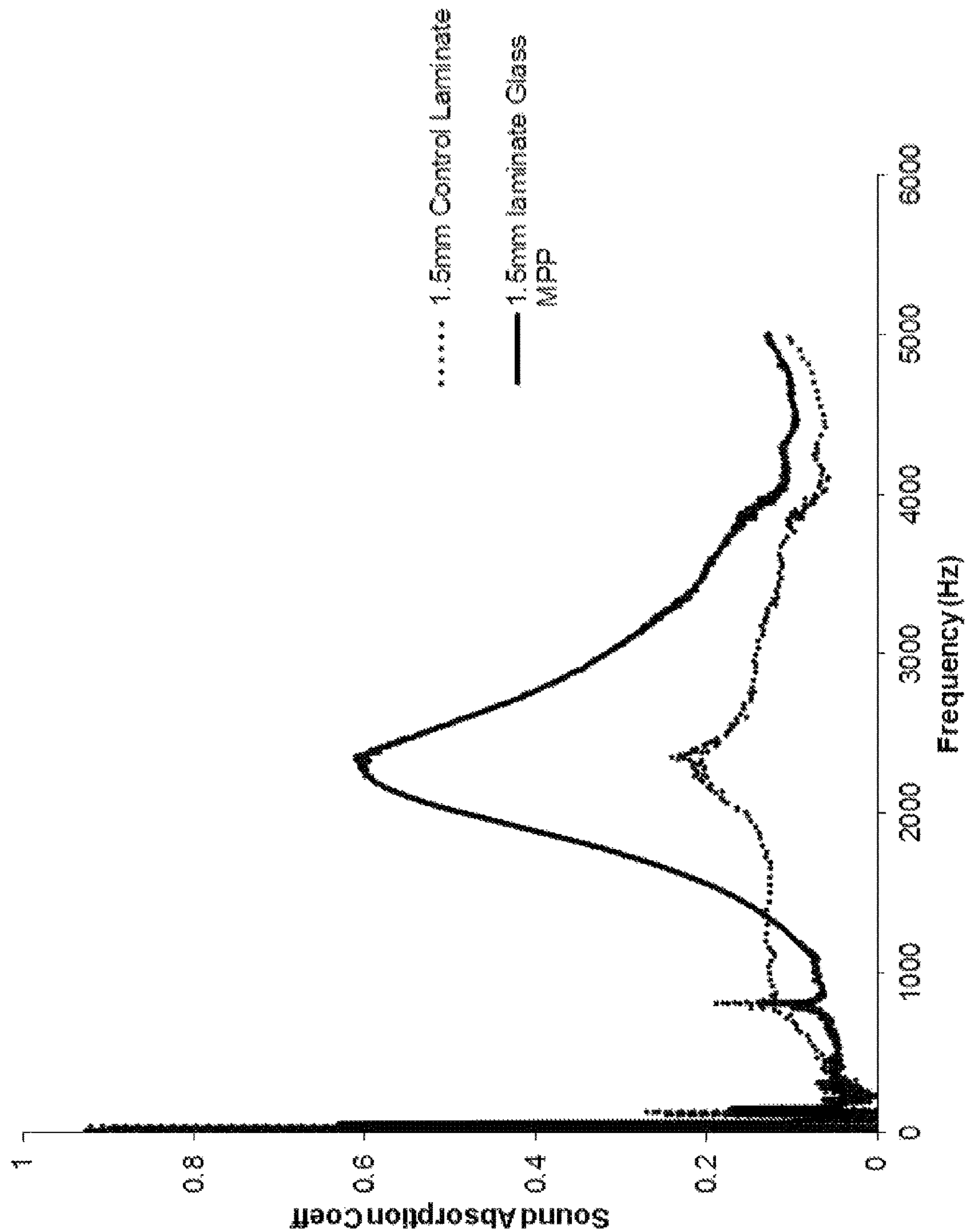
FIG. 19 shows representative sound absorption coefficient across various frequencies of a 1.5 mm thick micro-perforated glass or glass-ceramics laminate according to an embodiment.
Figure 20:
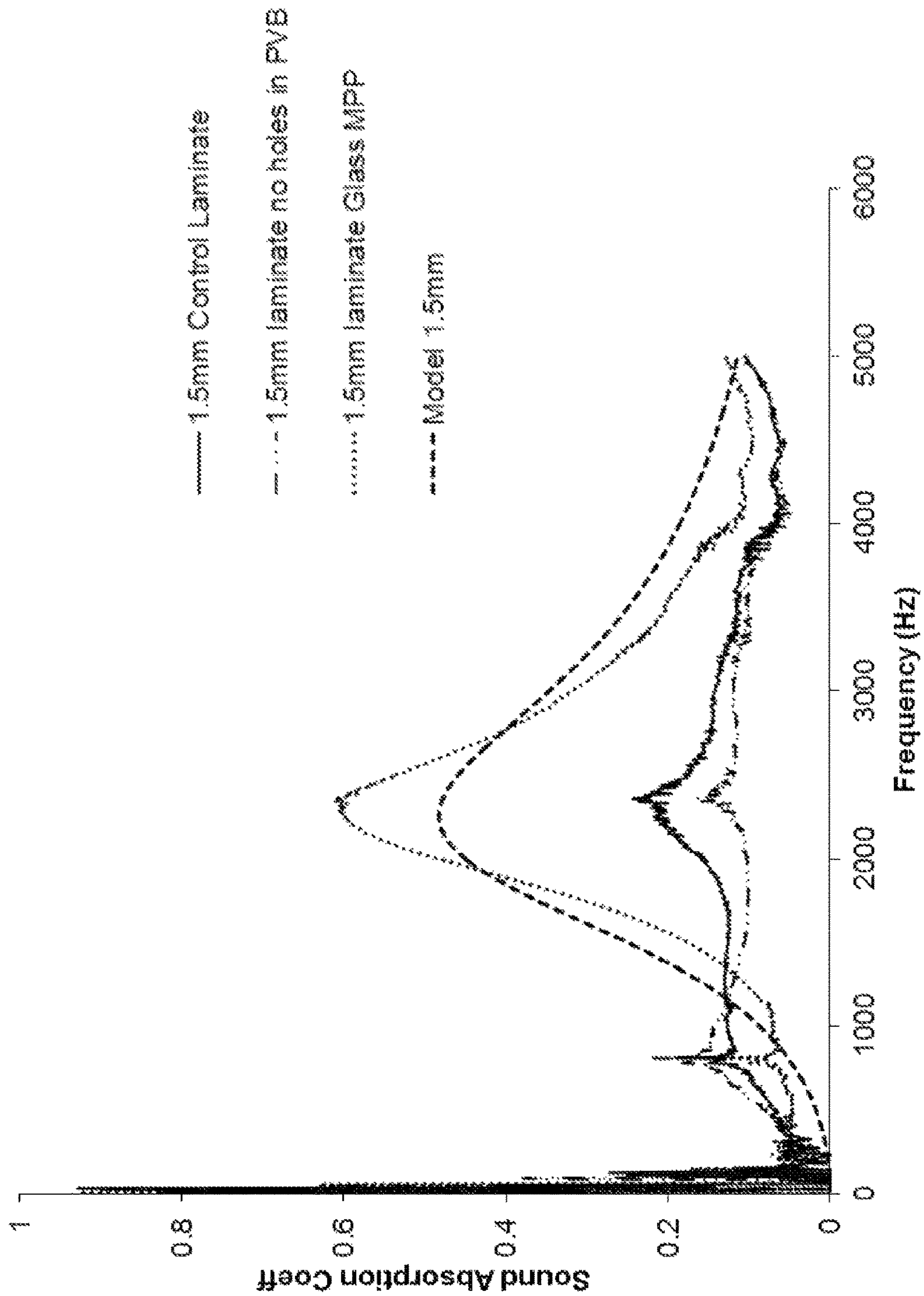
FIG. 20 shows representative sound absorption coefficient across various frequencies for controls, simulated models and micro-perforated glass or glass-ceramics laminates according to an embodiment.
Figure 21:
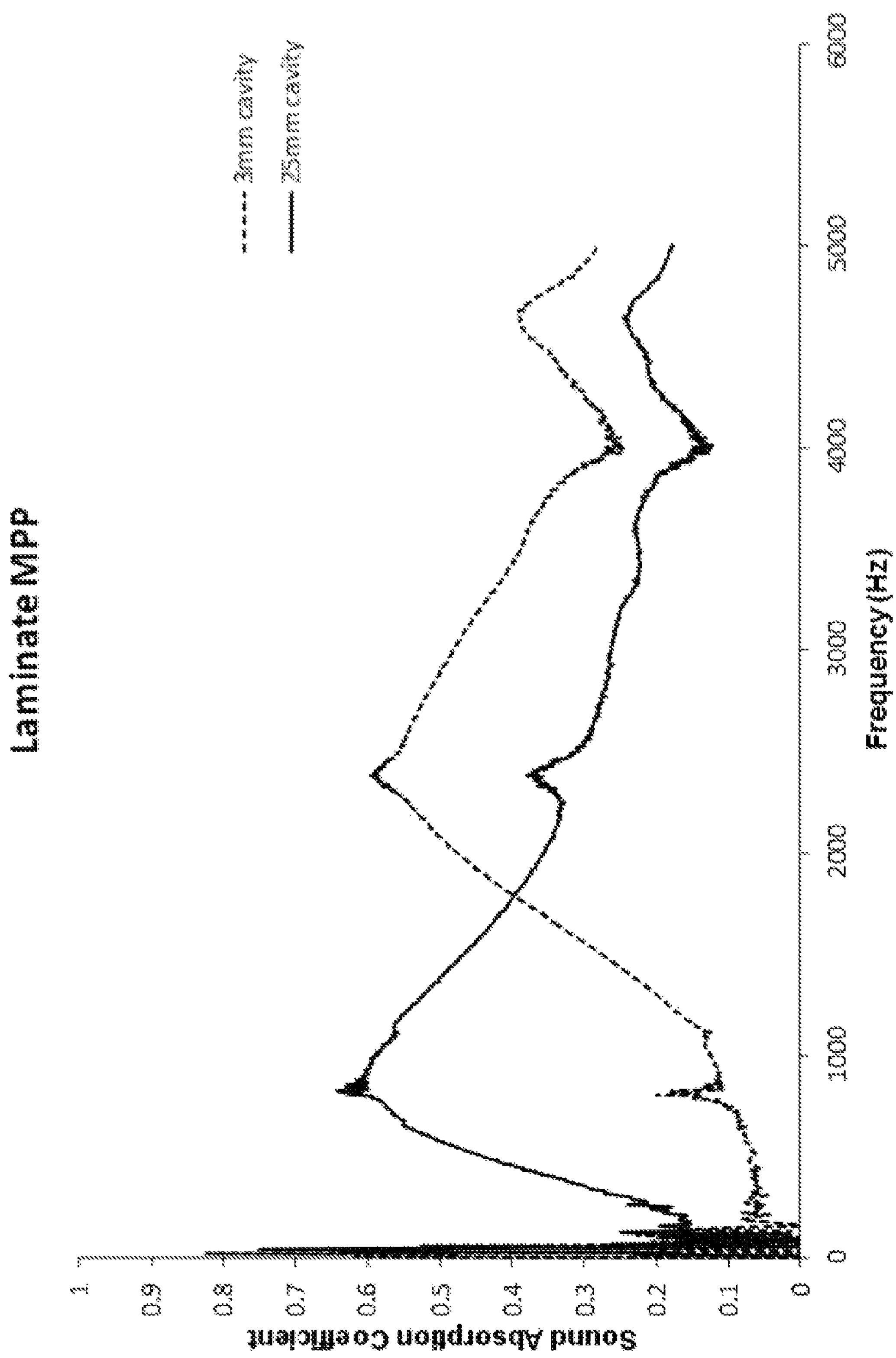
FIG. 21 shows representative sound absorption coefficient across various frequencies for micro-perforated glass or glass-ceramics laminates with 3 mm and 25 mm cavity spacing according to an embodiment.

FIGS. 19-21 show sound absorption coefficients across a range of acoustic frequencies (Hz) for various laminate systems and controls. The sound absorption coefficient is the ratio of the absorbed sound intensity to the incident sound intensity on a surface of the absorber. The targeted acoustic frequencies in the interior architectural spaces are linked to the speech frequencies which may lie in the range of 500-5000 Hz. In the figures, an absorption coefficient of "1" indicates complete absorption.

FIG. 19 shows a comparison of measured normal incidence acoustic absorption for a 1.5 mm thick control laminate (non-perforated) and a 1.5 mm thick micro-perforated glass laminate with the same cavity spacing across a range of frequencies (Hz). It can be observed from FIG. 19 that sound absorption coefficient of micro-perforated glass laminates is higher than the control glass laminate of same thickness and cavity spacing. In some embodiments, the sound absorption coefficient of the micro-perforated glass laminate may be about 3× higher than the control non-perforated laminate having the same thickness and cavity spacing.

FIG. 20 shows a comparison of sound absorption coefficient vs. frequency for controls and laminates. It can be observed that the control laminate comprising two glass substrates laminated with a polymer interlayer (PVB) having no perforations and the laminate with no perforations in the polymer interlayer (PVB) show poor acoustic absorption, attributed to the inhibition of the acoustic passage at the non-perforated polymer interlayer (PVB). The micro-perforated glass laminate having the same total thickness and cavity spacing, however, showed good sound absorption coefficient (>0.6) at the same frequency, consistent with the model data.

In some embodiments, the model data was obtained by developing a code to calculate acoustic impedance from the equations described above, and subsequently calculating the sound absorption coefficient (Maa's Theory) using the formula:

$$\alpha = \frac{4\mathrm{Re}[Z]}{(1+\mathrm{Re}[Z])^2 + (\mathrm{Im}[Z])^2}$$

where α is the absorption coefficient, Re[Z] is the real part of the acoustic impedance, and 1 m[Z] is the imaginary part of the acoustic impedance.

FIG. 21 shows sound absorption coefficient vs. frequency for two micro-perforated glass or glass-ceramics laminates with different cavity spacings. It can be observed that location of the peak frequency and the width may be tuned by adjusting the cavity spacing. Furthermore, the height and width of the sound absorption curve can be customized by changing the micro-perforated glass or glass-ceramics laminate attributes such as perforation size, perforation spacing, porosity of the perforations, perforation designs, perforation shape, etc. and a combination thereof. In some embodiments, the design attributes of the micro-perforated glass or glass-ceramics laminate may determine the noise reduction coefficient of the glass or glass-ceramics laminate.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

Examples

Samples of micro-perforated glass laminates were formed. Several paths for forming micro-perforated glass laminates were tested in order to demonstrate feasibility and sound absorption characteristics. These include solvent etching and laser drilling of the polymer interlayer PVB. Though the final product would likely be produced as rectangular or square panels for integration into larger installations, for the sake of development and acoustic testing, discs of glass ~35 mm diameter were used.

A. Materials—For the polymer interlayer, PVB, samples of Eastman Solutia Saflex RB11 and SentryGlas® 5000 (obtained from Kuraray America Inc.) were used. From these, RB11 was selected for lamination due to its favorable solubility in solvents and minimal thickness at 0.38 mm.

B. PVB and SentryGlas solubility—For Saflex RB11, it was found that 40-60% methanol with the balance toluene was optimal with dissolution taking place after 15-30 minutes, in contrast to 100% methanol taking >1 hour and 100% toluene showing no dissolution after several days. Butyl glycol and butyl diglycol, sometimes mentioned in the literature as solvents for PVB granules, were tested and found to require >4 hours when stirred. Dissolution times under sonication were shorter. SentryGlas® was tested against a wide variety of solvents and acids that are listed as incompatible materials from a stability standpoint. Some attack was seen over the course of days, though incomplete dissolution was noticed. Solvent etching is not a viable path for laminates prepared with SentryGlas®.

C. Lamination—Discs of PVB (Saflex RB11) were cut by hand and aligned between two glass discs, leaving 1-2 mm excess PVB around the edge. Parts were placed on top of a small beaker and a second beaker filled with metal pellets was set on top as a weight. Parts were held at room temperature under ~23 inHg vacuum for before heating began. Parts were heated to ~160° C. until the part turned transparent and the PVB shrunk slightly at the edges. Parts were cooled under $N_2$. Excess PVB was removed with a razor blade or hot knife. Most parts were free of bubbles. Alternatively, discs of PVB were cut to the diameter of the glass discs using a punch. Parts were aligned and sandwiched between release cloth. Parts were tacked under vacuum at RT and were finished in an autoclave.

D. Laser drilling and HF etching of glass substrates—Two GG (Gorilla Glass) discs were laminated with a PVB interlayer, then laser drilled (process described in detail above) and HF etched. The opening may be hourglass shaped or relatively cylindrical depending on opening dimensions and bath conditions. When etching laminates, the PVB layer prevents entry by HF on the laminated side. Therefore the openings in each glass disc are conical rather than cylindrical in shape. If parts are insufficiently etched, they may not be open at all at the PVB or barely open, requiring a lengthy solvent etch to form an opening in the PVB. It is possible to laminate glass discs that are laser drilled/HF etched with PVB, which provides a laminate with openings of more uniform dimensions. This route involves a more complicated alignment step as the openings must line up.

E. Solvent Etching—To avoid undesirable etching of exposed edges of the PVB layer, the edges were sealed with Dow Corning clear RTV sealant and allowed to cure overnight. A mixture of 60% toluene and 40% methanol by volume was added to a beaker in a Branson 3510 bench top ultrasonic cleaner and the part was submerged. No active heating was used. Sonication times were commonly between two and twenty minutes depending on the opening at the PVB layer. Excess solvent was removed following etching by placing the parts in a vacuum oven at 20-40° C.

F. Laser drilling PVB interlayer—As an alternative to solvent etching the PVB layer, an array of openings matching the spacing of the glass discs was laser drilled/ablated in several small squares of PVB using a $CO_2$ laser. The opening was roughly ~340 μm, as shown in FIG. 18. These squares of drilled PVB were cut into rounds by hand. Openings in the PVB were aligned with openings in each of two glass discs using 0.005" stainless steel wire. The glass discs and the PVB layer were successfully laminated. Further optimization of the opening diameter and tacking/autoclave conditions is needed.

G. Verification of through openings—Dye Penetrant analysis proves that the micro-perforations in the glass laminate were through openings. To confirm that the openings were through, they were filled with a fluorescent dye in an index matching fluid. A Zeiss Confocal Microscope was used to profile through the thickness of the laminate and across multiple openings. It was observed that the PVB opening size can be controlled by solvent etching time. PVB openings ranging from ~50 μm to ~150 μm in diameter were obtained.

H. Results—Acoustic performance: The 1.5 mm micro-perforated glass laminate showed good sound absorption (coefficient >0.6), as shown in FIG. 20. The Noise Reduction Coefficient can also be tuned by adjusting the cavity spacing, as shown in FIG. 21. A cavity spacing of 25 mm resulted in a higher NRC than compared to a cavity depth of 3 mm. Furthermore, the height and width of the sound absorption curve can be customized by changing the micro-perforated glass or glass-ceramics laminate attributes.

I. Results—Life testing: Parts were tested for edge delamination due to exposure to moisture. No obvious delamination after several weeks each at 60° C./90% RH and 85° C./85% RH was observed.

Aspect (1) of this disclosure pertains to a micro-perforated glass or glass-ceramics laminate, comprising: a first substrate laminated to a second substrate by a first polymer interlayer, wherein the first and the second substrates are independently selected from glass and glass-ceramics; and a plurality of micro-perforations, each of the plurality of micro-perforations extending through the first substrate, the first polymer interlayer, and the second substrate.

Aspect (2) of this disclosure pertains to the micro-perforated glass or glass-ceramics laminate of Aspect (1), further comprising, in order: the first substrate; the first polymer interlayer; the second substrate; a second polymer interlayer; and a third substrate laminated to the second substrate by the second polymer interlayer, wherein the third substrate is selected from glass and glass-ceramics.

Aspect (3) of this disclosure pertains to the micro-perforated glass or glass-ceramics laminate of Aspect (1) or Aspect (2), wherein the Noise Reduction Coefficient (NRC) of the micro-perforated glass or glass-ceramics laminate is between 0.3 and 1.

Aspect (4) of this disclosure pertains to the micro-perforated glass or glass-ceramics laminate of any of Aspects (1) through (3), wherein the largest dimension of each of the plurality of micro-perforations in a plane of the micro-perforated glass or glass-ceramics laminate ranges from 20 um to 1000 um.

Aspect (5) of this disclosure pertains to the micro-perforated glass or glass-ceramics laminate of any of Aspects (1) through (4), wherein the ratio of thickness of the glass or glass-ceramics laminate to the largest dimension of each of the plurality of micro-perforations in the plane of the micro-perforated glass or glass-ceramics laminate is between 0.1 and 20.

Aspect (6) of this disclosure pertains to the micro-perforated glass or glass-ceramics laminate of any of Aspects (1) through (5), wherein the spacing between adjacent micro-perforations in the plane of the micro-perforated glass or glass-ceramics laminate ranges from 40 um to 5000 um.

Aspect (7) of this disclosure pertains to the micro-perforated glass or glass-ceramics laminate of any of Aspects (1) to (6), wherein the porosity of the micro-perforations in the glass or glass-ceramics laminate ranges from 0.5% to 20%.

Aspect (8) of this disclosure pertains to the micro-perforated glass or glass-ceramics laminate of Aspects (1) through (7), wherein the shape of the micro-perforations through the first substrate, the first polymer interlayer, and the second substrate is selected from the group consisting of cylindrical, conical, hour-glass, and combinations thereof.

Aspect (9) of this disclosure pertains to the micro-perforated glass or glass-ceramics laminate of any of Aspects (1) through (8), wherein the largest dimension of each of the plurality of micro-perforations is uniform.

Aspect (10) of this disclosure pertains to the micro-perforated glass or glass-ceramics laminate of any of Aspects (1) through (8), wherein the largest dimension of each of the plurality of micro-perforations is non-uniform.

Aspect (11) of this disclosure pertains to the micro-perforated glass or glass-ceramics laminate of any of Aspects (1) through (10), wherein the spacing between adjacent micro-perforations is uniform.

Aspect (12) of this disclosure pertains to the micro-perforated glass or glass-ceramics laminate of any of Aspects (1) through (10), wherein the spacing between adjacent micro-perforations is non-uniform.

Aspect (13) of this disclosure pertains to the micro-perforated glass or glass-ceramics laminate of any of Aspects (2) through (12), wherein the first and second polymer interlayers are individually selected from the group consisting of polyvinyl butyral (PVB), ethylene-vinyl acetate, ionomers, polyurethanes, and polycarbonates.

Aspect (14) of this disclosure pertains to the micro-perforated glass or glass-ceramics laminate of any of Aspects (2) through (13), wherein the first and second polymer interlayers are optically transparent, translucent, frosted, or colored.

Aspect (15) of this disclosure pertains to the micro-perforated glass or glass-ceramics laminate of any of Aspects (2) through (14), wherein the first and second polymer interlayers comprise a single layer or multiple layers.

Aspect (16) of this disclosure pertains to a method of forming a micro-perforated glass or glass-ceramics laminate, the method comprising: laminating a polymer interlayer between a first substrate and a second substrate, wherein the first and the second substrates are independently selected from glass or glass-ceramics, to form a glass or glass-ceramics laminate having a thickness; forming a plurality of openings in the first substrate; forming a plurality of openings in the second substrate; and forming a plurality of openings in the polymer interlayer, wherein the plurality of openings in each of the first substrate, the polymer interlayer and the second substrate are aligned to form a plurality of micro-perforations through the thickness of the glass or glass-ceramics laminate.

Aspect (17) of this disclosure pertains to the method of Aspect (16), wherein the Noise Reduction Coefficient (NRC) of the micro-perforated glass or glass-ceramics laminate is between 0.3 and 1.

Aspect (18) of this disclosure pertains to the method of Aspects (16) or (17), wherein laminating the polymer interlayer between the first substrate and the second substrate is performed before forming the plurality of openings in the first substrate, the second substrate and the polymer interlayer.

Aspect (19) of this disclosure pertains to the method of Aspects (16) or (17), wherein laminating the polymer interlayer between the first substrate and the second substrate is performed after forming the plurality of openings in the first substrate, the second substrate and the polymer interlayer.

Aspect (20) of this disclosure pertains to the method of any of Aspects (16) through (19), wherein forming the plurality of openings in the first and second substrates comprises: forming a plurality of damage tracks with a first laser beam; and etching the first and second substrates having the plurality of damage tracks in an acid solution.

Aspect (21) of this disclosure pertains to the method of Aspect (20), further comprising: laminating the polymer interlayer between the first substrate and the second substrate to form the glass or glass-ceramics laminate; forming the plurality of damage tracks in the first substrate and the second substrate with the first laser beam; after forming the plurality of damage tracks, etching the first and second substrates in the acid solution to form the plurality of openings in the first substrate and the second substrate from the plurality of damage tracks; and after forming the glass or glass-ceramics laminate and after forming the plurality of openings in the first and second substrates, removing a portion of the polymer interlayer to form the micro-perforated glass or glass-ceramics laminate.

Aspect (22) of this disclosure pertains to the method of Aspect (20), further comprising: forming the plurality of damage tracks in the first and second substrates with the first laser beam; forming the plurality of openings in the polymer interlayer with a second laser beam; etching the first and second substrates having the plurality of damage tracks in the acid solution to form the plurality of openings in the first and second substrates; and after etching, laminating the polymer interlayer between the first and second substrates while the plurality of openings in the first and second substrates and the plurality of openings in the polymer interlayer are aligned.

Aspect (23) of this disclosure pertains to the method of any of Aspects (16) through (22), wherein forming the plurality of openings in the polymer interlayer is performed by a process selected from the group consisting of solvent etching, laser drilling, thermal discharge, physical puncturing, mechanical drilling, and combinations thereof.

Aspect (24) of this disclosure pertains to the method of any of Aspects (16) through (22), wherein forming the plurality of openings in the first and second substrates is performed by a process selected from the group consisting of acid etching, laser drilling, laser drilling followed by acid etching, mechanical drilling, and combinations thereof.

Aspect (25) of this disclosure pertains to the method of any of Aspects (16) to (24), wherein the plurality of damage tracks are grouped into a plurality of clusters, each cluster including more than one damage track, wherein damage tracks within each cluster merge into a single micro-perforation during etching the first and second substrates, and each cluster forms a discrete micro-perforation.

Aspect (26) of this disclosure pertains to the method of any of Aspects (16) through (24), wherein the each of the plurality of damage tracks forms a discrete micro-perforation during etching the first and second substrates.

Aspect (27) of this disclosure pertains to a micro-perforated glass or glass-ceramics laminate, formed by a method comprising: laminating a polymer interlayer between a first substrate and a second substrate, wherein the first and the second substrates are independently selected from glass or glass-ceramics, to form a glass or glass-ceramics laminate having a thickness; forming a plurality of openings in the first substrate; forming a plurality of openings in the second substrate; and forming a plurality of openings in the polymer interlayer, wherein the plurality of openings in each of the first substrate, the polymer interlayer and the second substrate are aligned to form a plurality of micro-perforations through the thickness of the glass or glass-ceramics laminate.

What is claimed is:

1. A micro-perforated glass or glass-ceramics laminate, comprising:

a first substrate laminated to a second substrate by a first polymer interlayer, wherein the first and the second substrates are independently selected from glass and glass-ceramics; and a plurality of micro-perforations, each of the plurality of micro-perforations extending through the first substrate, the first polymer interlayer, and the second substrate;

wherein the largest dimension of each of the plurality of micro-perforations in a plane of the micro-perforated glass or glass-ceramics laminate ranges from 20 um to 1000 um; and wherein the Noise Reduction Coefficient (NRC) of the micro-perforated glass or glass-ceramics laminate is between 0.3 and 1.

2. The micro-perforated glass or glass-ceramics laminate of claim 1, further comprising, in order:

the first substrate;

the first polymer interlayer;

the second substrate;

a second polymer interlayer; and a third substrate laminated to the second substrate by the second polymer interlayer, wherein the third substrate is selected from glass and glass-ceramics.

3. The micro-perforated glass or glass-ceramics laminate of claim 1, wherein the ratio of thickness of the glass or glass-ceramics laminate to the largest dimension of each of the plurality of micro-perforations in the plane of the micro-perforated glass or glass-ceramics laminate is between 0.1 and 20.

4. The micro-perforated glass or glass-ceramics laminate of claim 1, wherein the spacing between adjacent micro-perforations in the plane of the micro-perforated glass or glass-ceramics laminate ranges from 40 um to 5000 um.

5. The micro-perforated glass or glass-ceramics laminate of claim 1, wherein the porosity of the micro-perforations in the glass or glass-ceramics laminate ranges from 0.5% to 20%.

6. The micro-perforated glass or glass-ceramics laminate of claim 1, wherein the spacing between adjacent micro-perforations is uniform.

7. The micro-perforated glass or glass-ceramics laminate of claim 1, wherein the spacing between adjacent micro-perforations is non-uniform.

8. The micro-perforated glass or glass-ceramics laminate of claim 2, wherein the first and second polymer interlayers are individually selected from the group consisting of polyvinyl butyral (PVB), ethylene-vinyl acetate, ionomers, polyurethanes, and polycarbonates.

9. The micro-perforated glass or glass-ceramics laminate of claim 2, wherein the first and second polymer interlayers are optically transparent, translucent, frosted, or colored.

10. A method of forming a micro-perforated glass or glass-ceramics laminate, the method comprising:

laminating a polymer interlayer between a first substrate and a second substrate, wherein the first and the second substrates are independently selected from glass or glass-ceramics, to form a glass or glass-ceramics laminate having a thickness;

forming a plurality of openings in the first substrate;

forming a plurality of openings in the second substrate; and forming a plurality of openings in the polymer interlayer;

wherein the plurality of openings in each of the first substrate, the polymer interlayer and the second substrate are aligned to form a plurality of micro-perforations through the thickness of the glass or glass-ceramics laminate;

wherein the largest dimension of each of the plurality of micro-perforations in a plane of the micro-perforated glass or glass-ceramics laminate ranges from 20 um to 1000 um; and wherein the Noise Reduction Coefficient (NRC) of the micro-perforated glass or glass-ceramics laminate is between 0.3 and 1.

11. The method of claim 10, wherein laminating the polymer interlayer between the first substrate and the second substrate is performed before forming the plurality of openings in the first substrate, the second substrate and the polymer interlayer.

12. The method of claim 10, wherein laminating the polymer interlayer between the first substrate and the second substrate is performed after forming the plurality of openings in the first substrate, the second substrate and the polymer interlayer.

13. The method of claim 10, wherein forming the plurality of openings in the first and second substrates comprises:

forming a plurality of damage tracks with a first laser beam; and etching the first and second substrates having the plurality of damage tracks in an acid solution.

14. The method of claim 13, further comprising:

laminating the polymer interlayer between the first substrate and the second substrate to form the glass or glass-ceramics laminate;

forming the plurality of damage tracks in the first substrate and the second substrate with the first laser beam;

after forming the plurality of damage tracks, etching the first and second substrates in the acid solution to form the plurality of openings in the first substrate and the second substrate from the plurality of damage tracks; and after forming the glass or glass-ceramics laminate and after forming the plurality of openings in the first and second substrates, removing a portion of the polymer interlayer to form the micro-perforated glass or glass-ceramics laminate.

15. The method of claim 13, further comprising:

forming the plurality of damage tracks in the first and second substrates with the first laser beam;

forming the plurality of openings in the polymer interlayer with a second laser beam;

etching the first and second substrates having the plurality of damage tracks in the acid solution to form the plurality of openings in the first and second substrates; and after etching, laminating the polymer interlayer between the first and second substrates while the plurality of openings in the first and second substrates and the plurality of openings in the polymer interlayer are aligned.

16. The method of claim 10, wherein forming the plurality of openings in the polymer interlayer is performed by a process selected from the group consisting of solvent etching, laser drilling, thermal discharge, physical puncturing, mechanical drilling, and combinations thereof.

17. The method of claim 10, wherein forming the plurality of openings in the first and second substrates is performed by a process selected from the group consisting of acid etching, laser drilling, laser drilling followed by acid etching, mechanical drilling, and combinations thereof.

* * * * *